US008821290B2

(12) United States Patent
Fujisawa et al.

(10) Patent No.: US 8,821,290 B2
(45) Date of Patent: Sep. 2, 2014

(54) AUTOMATIC MOVEMENT OF DISCONNECTED CHARACTER IN NETWORK GAME

(75) Inventors: Jin Fujisawa, Tokyo (JP); Takashi Anzai, Tokyo (JP); Yoichi Kuroda, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 222 days.

(21) Appl. No.: 13/347,103

(22) Filed: Jan. 10, 2012

(65) Prior Publication Data

US 2012/0190443 A1     Jul. 26, 2012

(30) Foreign Application Priority Data

Jan. 12, 2011  (JP) ................................ 2011-004301

(51) Int. Cl.
*A63F 13/00* (2014.01)
*A63F 13/10* (2006.01)
*A63F 13/12* (2006.01)

(52) U.S. Cl.
CPC ......... *A63F 13/12* (2013.01); *A63F 2300/5553* (2013.01); *A63F 2300/554* (2013.01); *A63F 2300/6054* (2013.01); *A63F 2300/5533* (2013.01); *A63F 2300/636* (2013.01); *A63F 13/10* (2013.01); *A63F 2300/807* (2013.01); *A63F 2300/61* (2013.01); *A63F 2300/6027* (2013.01)
USPC ............................................. 463/42; 463/31

(58) Field of Classification Search
USPC ..................................... 463/31, 42
See application file for complete search history.

(56) References Cited

U.S. PATENT DOCUMENTS

| | | | |
|---|---|---|---|
| 7,058,690 B2 | 6/2006 | Maehiro | |
| 2004/0143852 A1* | 7/2004 | Meyers | 725/133 |
| 2007/0260567 A1 | 11/2007 | Funge et al. | |
| 2008/0090659 A1* | 4/2008 | Aguilar et al. | 463/42 |
| 2008/0091692 A1* | 4/2008 | Keith et al. | 707/100 |
| 2008/0097948 A1 | 4/2008 | Funge et al. | |
| 2008/0235581 A1 | 9/2008 | Caporale et al. | |
| 2009/0259948 A1 | 10/2009 | Hamilton, II et al. | |
| 2011/0151976 A1* | 6/2011 | Holloway et al. | 463/42 |
| 2011/0256932 A1* | 10/2011 | Kim et al. | 463/42 |

FOREIGN PATENT DOCUMENTS

| | | |
|---|---|---|
| JP | 2002-297536 | 10/2002 |
| JP | 2007-061253 | 3/2007 |
| JP | 2009-240570 | 10/2009 |
| WO | 2006/014560 | 2/2006 |

OTHER PUBLICATIONS

U.S. Appl. No. 13/347,226 to Jin Fujisawa et al., filed Jan. 10, 2012.

(Continued)

*Primary Examiner* — James S McClellan
(74) *Attorney, Agent, or Firm* — Greenblum & Bernstein, P.L.C.

(57) ABSTRACT

A player performs a player character registration operation to register a player character for enabling copying of the player character, and sets the player's own video game apparatus off-line. Another player who manipulates an on-line video game apparatus can generate a copy NPC from the player character of the off-line registered video game apparatus by performing a player character copying operation. A server apparatus decides the movement of the copy NPC based on an action log storing actions of the original player character of the copy.

20 Claims, 10 Drawing Sheets

(56) References Cited

OTHER PUBLICATIONS

Extended European Search Report from European Patent Office (EPO) in European Application No. 12150832.9, dated Nov. 22, 2013.

"What's the best way to store changes to database records that require approval before being visible?", StackOverflow, XP002715729, pp. 1-3 (Sep. 20, 2008), available at url:http://stackoverflow.com/questions/103766/whats-the-best-way-to-store-changes-to-database-records-that-require-approval-b (retreived on Oct. 30, 2013).

Office Action from Japan Patent Office (JPO) in Japanese Patent Application No. 2011-004301, dated Jan. 15, 2013, along with an English languag translation thereof.

Office Action from Japan Patent Office (JPO) in Japanese Patent Application No. 2011-004301, dated Sep. 17, 2013 along with an English language translation thereof.

* cited by examiner

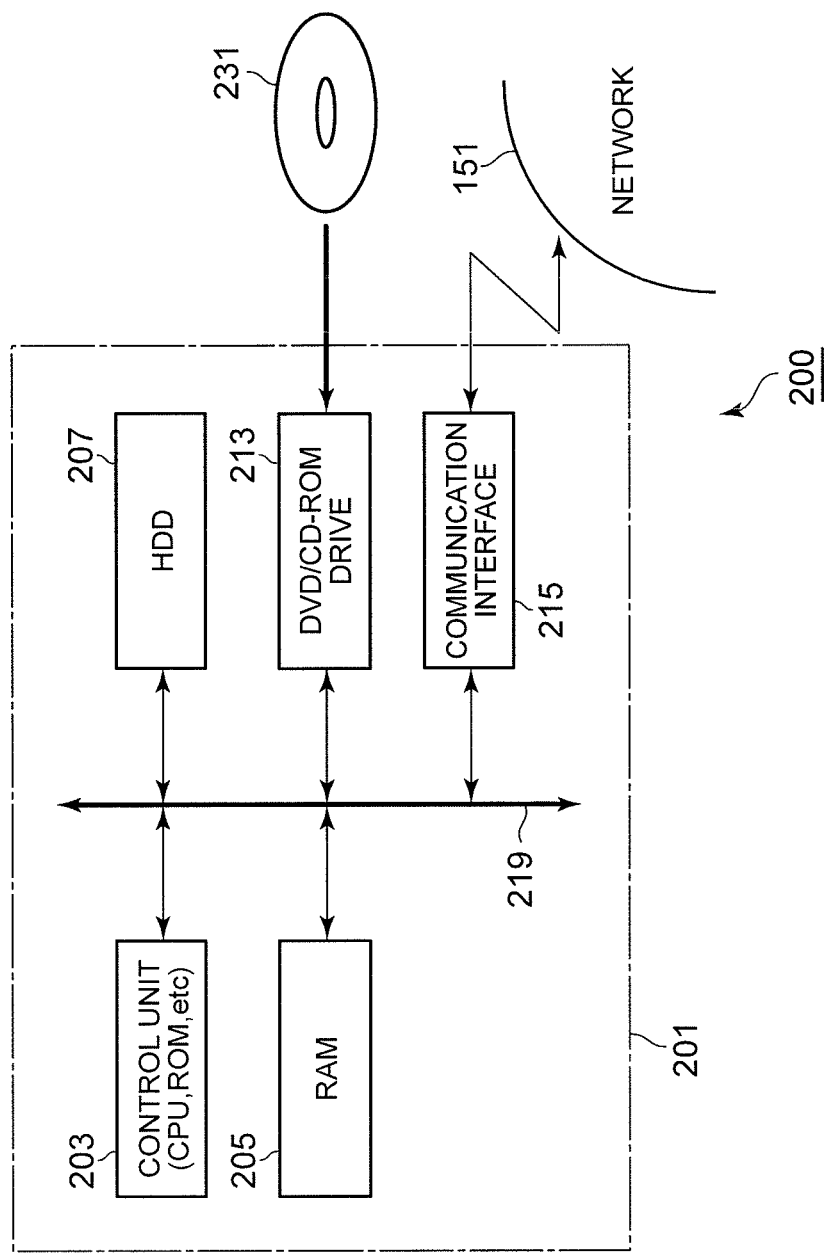

FIG. 4A

PLAYER CHARACTER MANAGEMENT TABLE 400

| PLAYER CHARACTER ID | PASSWORD | ADDRESS | ON-LINE FLAG | AUTOPILOT FLAG | POSITION | LEVEL | PARA-METERS | EXPERIENCE VALUE |
|---|---|---|---|---|---|---|---|---|
| 100001 | | | 1 | 0 | | | | |
| 100002 | | | 1 | 1 | | | | |
| 100003 | | | 0 | 0 | | | | |
| ⋮ | ⋮ | ⋮ | ⋮ | ⋮ | ⋮ | ⋮ | ⋮ | ⋮ |
| 401 | 402 | 403 | 404 | 405 | 406 | 407 | 408 | 409 |

FIG. 4B

REGISTERED-CHARACTER MANAGEMENT TABLE 410

| PLAYER CHARACTER ID | ON-LINE FLAG | ACCEPTANCE DISABLE FLAG | LOCATION-OF-REGISTRATION | NUMBER OF COPIES | ACCUMULATED EXPERIENCE VALUE |
|---|---|---|---|---|---|
| 100001 | 0 | 0 | | 10 | |
| 100002 | 1 | 1 | | 0 | |
| 100003 | 0 | 1 | | 1 | |
| ⋮ | ⋮ | ⋮ | ⋮ | ⋮ | ⋮ |
| 411 | 412 | 413 | 414 | 415 | 416 |

FIG. 4C

NPC MANAGEMENT TABLE 420

| NPC ID | PLAYER CHARACTER ID | COPY NPC FLAG | POSITION | PARA-METERS | EXPERIENCE VALUE |
|---|---|---|---|---|---|
| 500001 | 100001 | 1 | | | |
| 500002 | 100003 | 1 | | | |
| 500003 | NULL | 0 | | | NULL |
| ⋮ | ⋮ | ⋮ | ⋮ | ⋮ | ⋮ |
| 421 | 422 | 423 | 424 | 425 | 426 |

FIG. 4D

PARTY MANAGEMENT TABLE 430

| PARTY ID | PARTY-FORMING PLAYER CHARACTER | PARTY-FORMING NPC |
|---|---|---|
| A101 | 0100.0200 | |
| A102 | 1100 | |
| B101 | | |
| ⋮ | ⋮ | ⋮ |
| 431 | 432 | 433 |

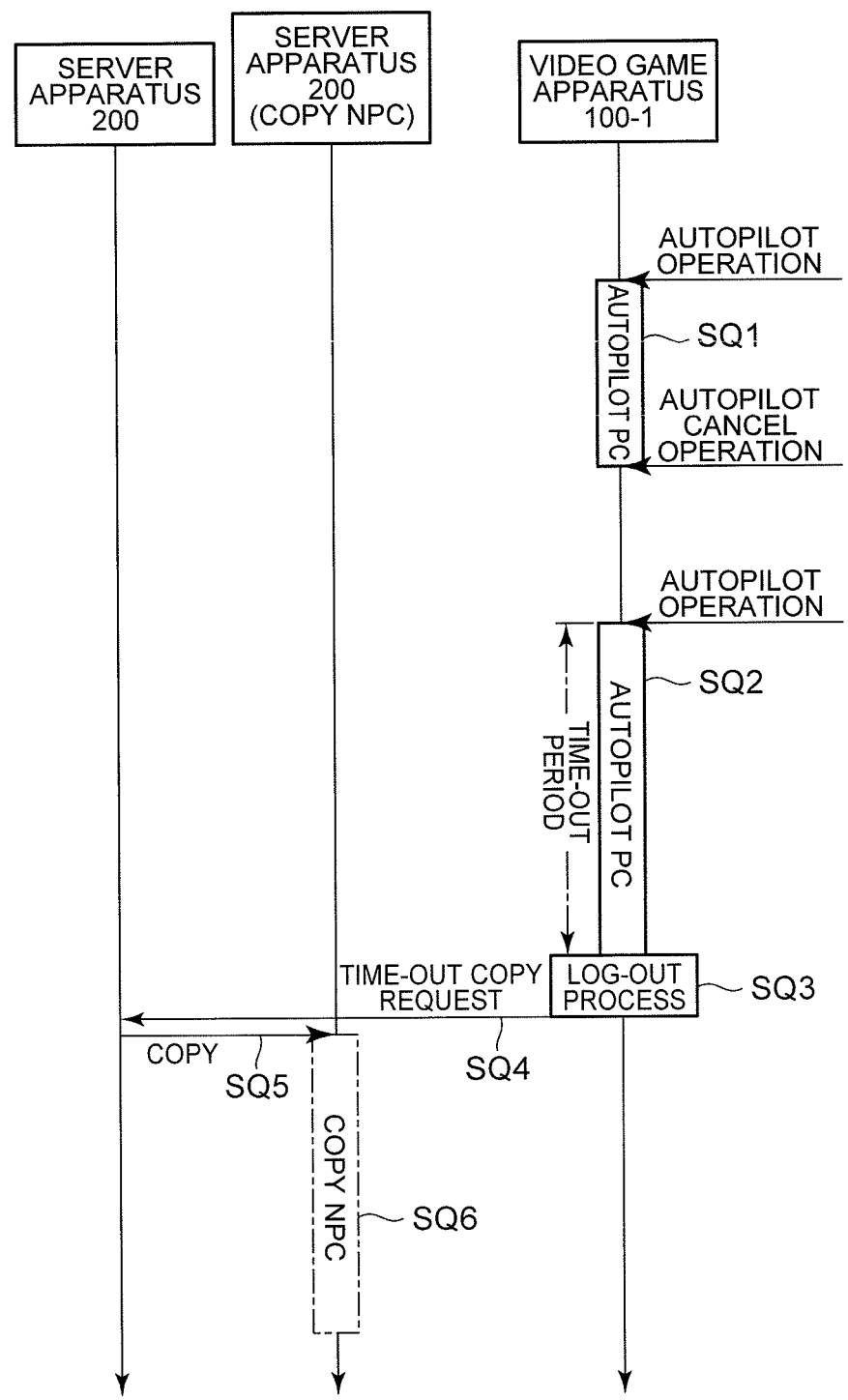

AUTOMATIC MOVEMENT OF DISCONNECTED CHARACTER IN NETWORK GAME

CROSS-REFERENCE TO RELATED APPLICATION

The present disclosure relates to subject matter contained in Japanese Patent Application No. 2011-004301, filed on Jan. 12, 2011, the disclosure of which is expressly incorporated herein by reference in its entirety.

BACKGROUND OF THE INVENTION

1. Field of the Invention

The present invention relates to a network game which progresses with a plurality of players participating in the game in a system including a server apparatus and a plurality of terminal apparatuses which are connected/disconnected to/from the server apparatus over a network, and, more particularly, to a network game which allows a character of a disconnected terminal apparatus to move.

2. Description of the Related Art

The recent advancement on the network technology has made network games (online games) vivid in each of which a plurality of players participate to progress with the game. A system that executes a network game includes a server apparatus which is managed by one who runs the network game, and client devices of individual players which are connectable to the server apparatus over a network such as the Internet.

An RPG (Role Playing Game) among the network games progresses as multiple players participate in the game at the same time so that their player characters cooperate with one another to battle with an opponent character, or the players make their player characters battle with one another. Recently, an MMORPG (Massively Multiplayer Online RPG) which permits participation of more players is also provided.

In a game system which allows an unspecified number of players to progress with a same game via no server apparatus but through radio communications only with portable game apparatuses, normally, each player performs an operation to progress with the game with a plurality of players present as disclosed in Japanese Patent Application Laid-Open Publication No. 2007-61253. In a network game system which allows a plurality of players to make a team and allows individual players in the team to cooperate with one another to progress with the game, a plurality of players who make the team need to be on-line at the same time to perform game operations.

However, individual players have different life environments, and are unlikely to match the timings of playing the same in real time. As a result, it is very likely that cooperation with player characters which are manipulated by other players who actually have significantly different life environments become difficult. This impairs the enjoyment or real thrill of an MMORPG which permits the player characters of other players participating in the network game to cooperate with one another in the game or to have a relationship with one another.

If a player tries to match the timing of playing a game with the timings of other players in real time to cooperate therewith among, the player cannot enjoy playing the game according to the player's own pace of life. This may decline the motivation of the player to play the game.

SUMMARY OF THE INVENTION

Accordingly, it is an object of the present invention to provide a network game system or the like which can permit the player character of a player to move even when a terminal apparatus which is manipulated by the player is not connected to a server apparatus.

To achieve the object, a network game system according to a first aspect of the invention is a network game system including a server apparatus, and a plurality of terminal apparatuses connected to the server apparatus over a network, wherein each of players who respectively use the terminal apparatuses manipulates a player's own player character to participate in a game provided by the server apparatus.

The server apparatus includes a connecting state management unit that manages information indicating whether each of the plurality of terminal apparatuses is connected to the server apparatus. The server apparatus further includes a character movement information receiver that receives character movement information transmitted from that terminal apparatus among the plurality of terminal apparatuses which is connected to the server apparatus. The server apparatus further includes a character information storage unit that stores information according to a progress of the game including a movement state of a player character which uses the terminal apparatus among the plurality of terminal apparatuses which is connected to the server apparatus. The server apparatus further includes a character movement state updating unit that updates the movement state of the player character stored in the character information storage unit according to the character movement information received by the character movement information receiver. The server apparatus further includes an automatic movement specifying unit that specifies a movement of a player character of a player who uses a terminal apparatus which is not connected to the server apparatus based on determination made by the server apparatus, not reception of the character movement information by the character movement information receiver. The server apparatus further includes a game progress information transmitter that transmits, to that terminal apparatus among the plurality of terminal apparatuses which is connected to the server apparatus, game progress information indicating a progress state of the game according to the movement state of the player character stored in the character information storage unit for the terminal apparatus connected to the server apparatus, and the movement state of the player character specified by the automatic movement specifying unit for the terminal apparatus which is not connected to the server apparatus.

Each of the plurality of terminal apparatuses includes a game progress information receiver that receives the game progress information transmitted from the game progress information transmitter. Each of the plurality of terminal apparatuses further includes a game screen display that generates a screen according to the game progress information received by the game progress information receiver, and displays the screen on a display device equipped in the terminal apparatus. Each of the plurality of terminal apparatuses further includes a manual movement instruction input unit that, as the player who uses the terminal apparatus performs a predetermined operation on an input device equipped in the terminal apparatus, inputs a manual movement instruction for moving the player's own player character. Each of the plurality of terminal apparatuses further includes a manual movement specifying unit that specifies a movement of the player character of the player using the terminal apparatus according to the manual movement instruction input from manual movement instruction input unit. Each of the plurality of terminal apparatuses further includes a character movement information transmitter that generates the character movement information according to the movement of the player character of the player specified by the manual movement specifying unit, and transmits the character movement information to the server apparatus to be received by the character movement information receiver.

According to the network game system according to the first aspect of the invention, the server apparatus manages the progress of the game according to the movements of player characters. A player inputs a manual movement instruction for moving the player's own player character according to the progress of the game. Each terminal apparatus specifies the movement of the player character according to the manual movement instruction, and transmits character movement information according to the specified movement to the server apparatus. However, a terminal apparatus which is not connected to the server apparatus does not transmit character movement information to the server apparatus, the player character of the disconnected terminal apparatus cannot move according to the manipulation of the player.

Even when the player character of the player whose terminal apparatus is not connected to the server apparatus does not move according to the player's manipulation, however, the server apparatus automatically specifies the movement of the player character of a terminal apparatus which is not connected to the server apparatus.

Even when a player actually cannot move the player's own player character, therefore, the player character of the player can be moved according to the progress of the game, so that another player using a terminal apparatus connected to the server apparatus can feel as if the player is playing the game with the former player. Accordingly, the player can play the game with other players with his/her own pace of life without being compelled to match the timing of playing the game with the other players in real time.

To achieve the object, a network game system according to a second aspect of the invention is a server apparatus connected to a plurality of terminal apparatuses over a network, and providing a game in which players respectively using the terminal apparatuses participate by manipulation of player characters of the players.

The server apparatus includes a connecting state management unit that manages information indicating whether each of the plurality of terminal apparatuses is connected to the server apparatus. The server apparatus further includes a character movement information receiver that receives character movement information transmitted from that terminal apparatus among the plurality of terminal apparatuses which is connected to the server apparatus and according to a movement of a player character which is specified according to a manual movement instruction input by the player using the terminal apparatus. The server apparatus further includes a character information storage unit that stores information according to a progress of the game including a movement state of a player character which uses the terminal apparatus among the plurality of terminal apparatuses which is connected to the server apparatus. The server apparatus further includes a character movement state updating unit that updates the movement state of the player character stored in the character information storage unit according to the character movement information received by the character movement information receiver. The server apparatus further includes an automatic movement specifying unit that specifies a movement of a player character of a player who uses a terminal apparatus which is not connected to the server apparatus based on determination made by the server apparatus, not reception of the character movement information by the character movement information receiver. The server apparatus further includes a game progress information transmitter that transmits, to that terminal apparatus among the plurality of terminal apparatuses which is connected to the server apparatus, game progress information for causing a display device equipped by the terminal apparatus connected to the server apparatus to display a progress state of the game according to the movement state of the player character stored in the character information storage unit for the terminal apparatus connected to the server apparatus, and the movement state of the player character specified by the automatic movement specifying unit for the terminal apparatus which is not connected to the server apparatus.

BRIEF DESCRIPTION OF THE DRAWINGS

FIG. 3 is a block diagram showing the configuration of a server apparatus shown in FIG. 1.

FIG. 4A is a diagram showing a player character management table which is managed by the server apparatus shown in FIGS. 1 and 3.

FIG. 4B is a diagram showing a registered-character management table which is managed by the server apparatus shown in FIGS. 1 and 3.

FIG. 4C is a diagram showing an NPC management table which is managed by the server apparatus shown in FIGS. 1 and 3.

FIG. 4D is a diagram showing a party management table which is managed by the server apparatus shown in FIGS. 1 and 3.

FIG. 10 is a sequence chart illustrating one example of a process associated with time-out of an autopilot PC.

BEST MODE FOR CARRYING OUT THE INVENTION

An embodiment of the invention will now be described with reference to the accompanying drawings.

Figure 1:
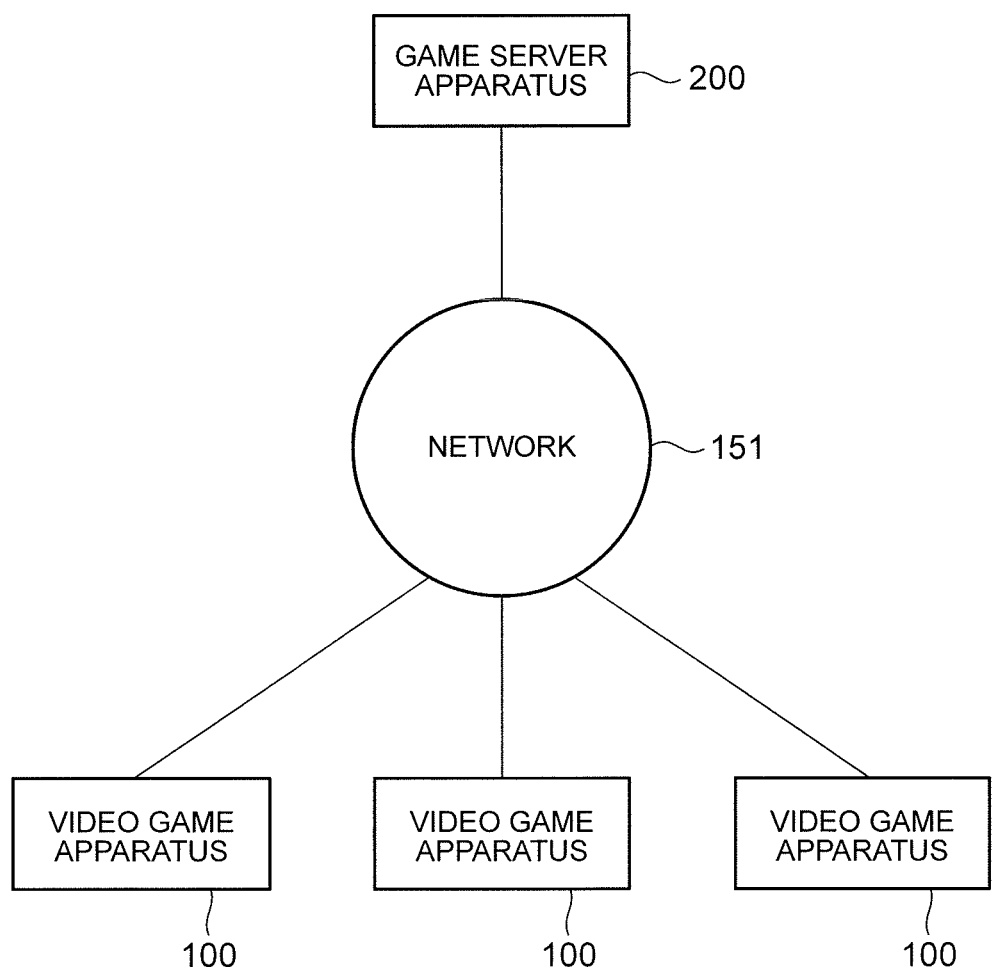
FIG. 1 is a block diagram showing the configuration of a network game system according to an embodiment of the invention.

FIG. 1 is a block diagram showing the general configuration of a network system where a network game according to this embodiment is played. As illustrated, the network system includes a plurality of video game apparatuses 100 connected to a server apparatus 200 over a network 151 like the Internet.

In a game which is applied to this network game system, each player who uses the video game apparatus 100 moves his/her own player character (hereinafter referred to as "player's own player character") on a field formed in virtual space (game space) common to all the players. Each player forms a party composed of the player's own player character, player characters which are moved by other players (hereinafter referred to as "other player characters"), and an NPC (Non-Player Character) other than an opponent character. The game progresses party by party.

When the party moves on a field and reaches a predetermined point in the progress of the game, the party battles with an opponent character encountered there. The individual player characters belonging to the party can get an experience value by defeating the opponent character in the battle. The acquisition of the experience value can allow each player to power up the player's own player character, so that the player can defeat a stronger opponent character.

As apparent from the above, when the video game apparatus 100 of the player is on-line, the player can move the player's own player character to progress the game. Even in the period where the video game apparatus 100 of the player is off-line, the player can move a copy of the player's own player character generated based on information on the player's own player character immediately before the off-line as an NPC (hereinafter, referred to as "copy NPC"). The game may be progressed by a party composing the video game apparatus 100 of the player, other player characters which are on-line, and the copy NPC. Even if the video game apparatus 100 of the player is on-line, the player can also progress with the game with a player's own player character which is moved without being manipulated by the player (hereinafter, referred to as "autopilot PC") for a given period.

According to the embodiment, the term "on-line" or "on-line state" means a state in a period from verification of a player using a video game apparatus 100 through a log-in process to a point when the player using the video game apparatus 100 leaves the game through a log-out process. In a period other than this period, even if the video game apparatus 100 exchanges some kind of information with the server apparatus 200, for example, the state is considered "off-line". For the sake of simplicity of the description of the embodiment, it is premised that communications between the video game apparatus 100 and the server apparatus 200 are not disconnected without going through the log-out process.

Figure 2:
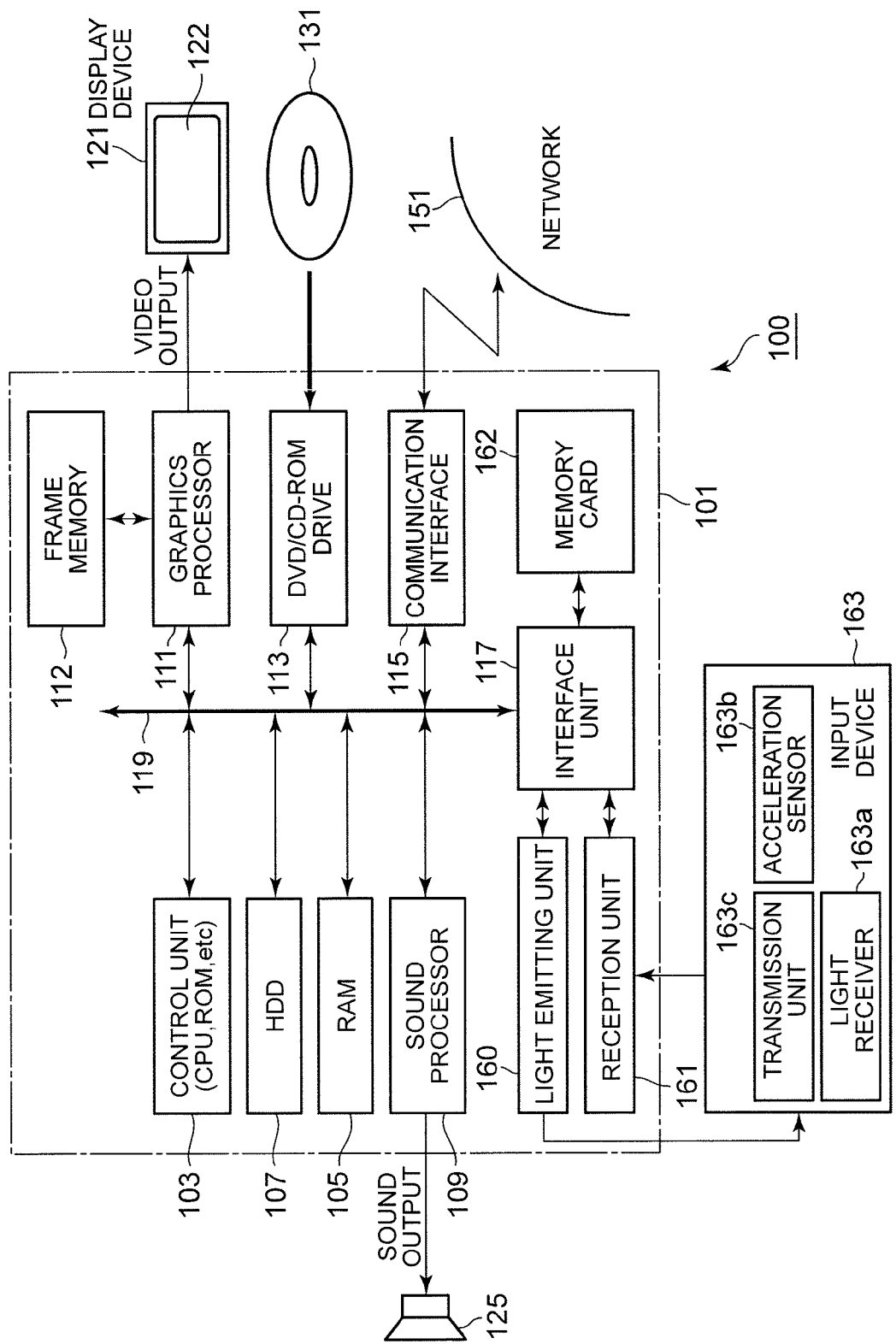
FIG. 2 is a block diagram showing the configuration of a video game apparatus shown in FIG. 1.

FIG. 2 is a block diagram showing the configuration of the video game apparatus 100 shown in FIG. 1. As illustrated, the video game apparatus 100 has a main body 101 as its main unit. The main body 101 includes a control unit 103, a RAM (Random Access Memory) 105, a hard disk drive (HDD) 107, a sound processor 109, a graphics processor 111, a DVD/CD-ROM drive 113, a communication interface 115, and an interface unit 117, all of which are connected to an internal bus 119.

The sound processor 109 of the main body 101 is connected to a sound output device 125 or a speaker, and the graphics processor 111 is connected to a display device 121 having a display screen 122. A recording medium (in this embodiment, DVD-ROM or CD-ROM) 131 is mountable in the DVD/CD-ROM drive 113. The communication interface 115 is connected to the network 151. A light emitting unit 160, a reception unit 161, and a memory card 162 are connected to the interface unit 117.

The control unit 103 includes a CPU (Central Processing Unit), and a ROM (Read Only Memory), and executes a program stored in the HDD 107 or on the recording medium 131 to control the main body 101. The control unit 103 includes an internal timer. The RAM 105 is used as a work area for the control unit 103, and temporarily stores information on the positions of player characters to be described later, HP (Hit Point which will be described later), etc. The HDD 107 is a storage area for storing programs and data. When instructed to output sounds by a program which is being executed by the control unit 103, the sound processor 109 interprets the instruction and outputs sound signals to the sound output device 125.

The graphics processor 111 maps image data in a frame memory 112 (which is shown outside the graphics processor 111 in FIG. 2 but is actually provided in a RAM included in a chip composing the graphics processor 111) in accordance with a drawing instruction output from the control unit 103, and outputs video signals to display images on the display screen 122 of the display device 121. One frame time of images in the video signals output from the graphics processor 111 is, for example, 1/30 sec. There are two sets of frame memories 112, one for writing and the other for reading, which are switched from one to the other for each frame period.

The DVD/CD-ROM drive 113 reads out programs and data from the recording medium 131. The communication interface 115 is connected to the network 151 to communicate with other computers. The light emitting unit 160 includes a plurality of LEDs having light irradiating directions different from one another, and is located in a position having a predetermined relation with the display device 121 (above or under the display device 121).

The input device 163 includes a light receiver 163a, an acceleration sensor 163b, and a transmission unit 163c. The light receiver 163a receives light emitted from each LED included in the light emitting unit 160. The number and positions of LEDs whose lights can be received by the light receiver 163a vary depending on the direction of the input device 163. The acceleration sensor 163b includes a multi-axis acceleration sensor having three or more axes, and detects the inclination and three-dimensional motion of the input device 163. The input device 163 has directional keys and a plurality of operation buttons.

The transmission unit 163c transmits an infrared signal according to the condition of the input device 163, more specifically, an infrared signal according to the inclination of the input device 163 and the direction and speed of the motion of the input device 163 which are detected by the acceleration sensor 163b, and inputs from the directional keys and the operation buttons of the input device 163. The infrared signal transmitted from the transmission unit 163c is received by the reception unit 161 as input data from the input device 163.

The input device 163 is used to perform a predetermined process, such as moving a player character (to be described later) by operating the directional keys. The directional keys are also used to move a cursor, and the operation buttons are used input predetermined instructions. The action of a player character (to be described later) is sequentially selected by the player operating the directional keys, and the selection is set by operating a specific operation button.

The interface unit 117 outputs input data received by the input unit 161 to the RAM 105. The control unit 103 interprets the input data and performs an arithmetic operation. In response to an instruction from the control unit 103, the interface unit 117 stores data representing the progress state of the game stored in the RAM 105 in the memory card 162, and reads out data on the game stored in the memory card 162 at the time the game has been suspended, and transfers the data to the RAM 105.

The programs and data for playing the game on the video game apparatus 100 are initially stored in, for example, the recording medium 131. The data stored in the recording medium 131 includes graphic data for creating objects present in the game space (the field formed in the game space, the player's own player character, other player characters, the opponent character). The programs and data which are stored in the recording medium 131 are read out by the DVD/CD-ROM drive 113 and are loaded onto the RAM 105 at the time of execution. The control unit 103 processes the programs and data loaded onto the RAM 105, outputs a drawing instruction to the graphics processor 111, and outputs a sound output instruction to the sound processor 109. Intermediate data which is produced while the control unit 103 is performing the processing is stored in the RAM 105.

FIG. 3 is a block diagram showing the configuration of the server apparatus 200 shown in FIG. 1. As shown, the server apparatus 200 has a main body 201 as its main unit. The main body 201 includes a control unit 203, a RAM 205, a hard disk drive (HDD) 207, a DVD/CD-ROM drive 213, and a communication interface 215, all of which are connected to an internal bus 219. A recording medium (DVD-ROM or CD-ROM) 231 is mounted in the DVD/CD-ROM drive 213.

The control unit 203 includes a CPU and a ROM, and executes a program stored in the HDD 207 or on the recording medium 231 to control the server apparatus 200. The control unit 203 includes an internal timer that measures a current time. The RAM 205 is used as a work area for the control unit 203. The HDD 207 is a storage area for storing programs or data. The communication interface 215 is connected to the network 151 to communicate with each video game apparatus 100.

The programs and data for playing a network game on the server apparatus 200 are initially stored in, for example, the recording medium 231, and are installed in the HDD 207 therefrom. The programs and data are read out from the HDD 207 and are loaded onto the RAM 205 at the time of execution. The control unit 203 processes the programs and data loaded onto the RAM 205, and progresses with the network game based on data transmitted from each video game apparatus 100. Intermediate data which is produced while the control unit 203 is performing the processing is stored in the RAM 205.

The following describes how the network game according to the embodiment progresses. There are a plurality of player characters which belong to a plurality of parties, a plurality of opponent characters and NPCs other than the opponent characters on a field in the network game. The term "NPC" when simply used herein is intended to include a copy NPC, and an NPC different from a copy NPC (hereinafter, referred to as "normal NPC"). Strictly speaking, an opponent character is a non-player character, but is not intended to belong to "NPCs". A party of player characters battles with an opponent character encountered on a field. When the party wins the battle and defeats the opponent character, characters belonging to the party (hereinafter, referred to as "party characters" including player characters and NPC) can get an experience value.

The experience value obtained through a battle is uniformly distributed to the individual player characters. Every time a player character obtains an experience value, the value is added to the previous experience value of the player character. When the accumulated experience value of the player character reaches a predetermined value, the level of the player character is incremented by "1". When the level is incremented, various parameters the player character has are increased (enhanced). When any one of the parameters has a larger value than the value of the parameter of an opponent character, the player character is advantageous over the opponent character in a battle therewith.

The predetermined value for the experience value to move up the level is set crescently. The parameter of an opponent character which provides a greater experience value when defeated is set larger than the parameter of an opponent character which provides a smaller experience value when defeated. That is, the former opponent character is stronger than the latter one. A player can power up the player's own player character by increasing the experience value of the player's own player character through repetitive battles, and progresses with the game to defeat stronger opponent characters.

The level of an autopilot PC, like that of a normal player character, also increases when the experience value of the autopilot PC becomes the predetermined value. However, the level of a copy NPC is not increased even when the experience value obtained through a battle becomes the predetermined value to move up the level. While the experience values of each player character, an autopilot PC and a copy NPC increase by an amount which is uniformly distributed to the party characters depending on the experience value obtained through a battle, the experience value of a normal NPC does not increase.

A description will now be given of how to generate a copy NPC, how to shift a player character to an autopilot PC, and how to register a player character in the network game according to the embodiment. The movement of a copy NPC is determined by the server apparatus 200, and the movement of a autopilot PC is determined by a video game apparatus 100 (those movements will be described in detail later). The following procedures are needed to move a copy NPC or an autopilot PC relating to the player's own player character in a party composing the player's own player character and other player characters without the player's being directly involved in the movement.

The procedures of generating a copy NPC is described below. The player in an on-line state moves the player's own player character to one of a plurality of predetermined locations of registration existing on a field. At such a location of registration, the player performs a player character registering operation for registering the player's own player character using the input device 163, so that the player's own player character is registered (hereinafter, referred to as "normal registration") after which the video game apparatus 100 manipulated by the player becomes on-line. At the time of the normal registration, the player sets whether the player character registered (hereinafter referred to as "registered player character") is to be copied or not.

Provided that the normal registration of the player character is done and the player has set the registered player character copyable, another on-line player can make the copy NPC belong to the player's own party by moving the player character registered in such a way to a location of registration, and performing a player character copying operation using the input device 163 during a period from the point when the player becomes off-line to the point when the player starts a log-in process (hereinafter referred to as "copy acceptance period"). The number of copy NPCs which can be generated by the player character copying operation is one per registered player character for one party, and is set not to exceed fifty.

The procedures of shifting a player character to an autopilot PC is described below. The player in an on-line state can make the player's own player character move as an autopilot PC merely by performing a predetermined operation to autopilot the player's own player character (hereinafter referred to as "autopilot operation") using the input device 163. Note however that even when the player's own player character composes a party with other player characters, all the player characters excluding the player's own player character are not NPCs or autopilot PCs. With a player character moving as an autopilot PC, the player can make the autopilot PC move as a player character again by performing an operation to depress a predetermined button on the input device 163 to cancel the movement (hereinafter referred to as "autopilot cancel operation").

When the state of an autopilot PC continues for a predetermined period (e.g., 60 minutes) without any input made by the autopilot cancel operation by the player, the video game apparatus 100 that moves the autopilot PC becomes off-line since the point when the predetermined period (hereinafter referred to as "time-out period") expires, and, after a log-out process, the player character will be registered (hereinafter referred to as "time-out registration") at the location where the normal registration has been made previously (registration accepted location where the immediately previous registration has been made). At this time, the player character which has been an autopilot PC composing the party as a member is deleted, and a copy NPC associated with the player character is generated in place of the player character after the time-out, and is moved as a member of the party to which the player character has belonged.

When the time-out registration is made, however, there is set a period during which a player character copying operation on the registered player character by another player character for a given period (e.g., 2 hours) is not accepted (hereinafter referred to as "acceptance disable period"). The player's resuming the game in the given period will be described later. When a player who moves the sole one player character composing the party is logged out within the given period, however, the log-out allows a time-out registered player character to be subject to a player character copying operation.

With regard to NPCs, when all the player characters belonging to the party become off-line, the party itself disappears, and a copy NPC and a normal NPC are deleted while an autopilot PC is registered at a location where the sole player character belonging to the party has become off-line. In this case, the sole player character belonging to the party is normally registered at the time of performing a log-out process, so that an autopilot PC is likewise registered in a way similar to the normal registration (hereinafter referred to as "pseudo normal registration"). To simplify the description of the embodiment, it is assumed that when log-out is done with a player character, communication between the video game apparatus 100 and the server apparatus 200 will not be disconnected without a log-out process being carried out through the normal registration of the player character which is made by the player character registration operation performed by the player.

The following describes a resume position of a player character in resuming the game, and a process of adding up the experience value of a copy NPC. When a player character is registered in the above-described manner, and the off-line video game apparatus 100 becomes on-line again to resume the game, the player can resume the game from the location where the player character has been present at the time of registration (the registration accepted location in case of normal registration, or the registration accepted location where the immediately previous registration has been made in case of time-out registration). In this case, if there is a copy NPC associated with the registered player character in the log-out process, every such copy NPC becomes a normal NPC and belongs to the party after the process associated with the log-in is terminated.

At the time of the log-out process, the player can select one of such copy NPCs, and become a member of the party in place of the selected copy NPC to resume the game from the position on a field where the copy NPC is present (hereinafter referred to as "game resuming position selecting process"). In this case, a copy NPC which takes place of a player character is deleted from the field, and every copy NPC other than the former copy NPC is moved as a normal NPC.

If at least one copy NPC of a player character is generated in an off-line state before the log-in process, the total of the experience values obtained by all the copy NPCs in the period of the off-line state (hereinafter referred to as "total experience value") is added to the experience value of the player character at the time of registration (hereinafter referred to as "experience value adding process"). Specifically, for a copy NPC present on a field at the time of the log-in process, all the experience values which have been obtained until the log-in process are added up and are then added to the experience value at the time of registration, whereas for a copy NPC which has been deleted as a result of disappearance of the party to which the copy NPC belongs, all the experience values from the point of generation of the copy NPC to the point of deletion thereof are added up and are then added to the experience value at the time of registration.

When the total experience value resulting from the addition exceeds a predetermined value at which the level of the player character moves up, the level of the player character is moved up when the log-in process is performed. In this manner, the player can resume the game with the player character with whose level has been moved up as a result of the addition of the experience value. After the experience value adding process in the log-in process, the experience value obtained in an off-line state by the original player character of every copy NPC is reset after the copy NPC becomes a normal NPC, and is not increased even if an experience value in a battle is distributed.

When the player of a player character whose copy by another player is disabled logs in again to be on-line and resumes the game within a given period from the point of the time-out registration during which a player character copying operation by another player is disabled, the player can resume the game soon in the party in which a copy NPC associated with this player character is present, without going through the game resuming position selecting process. At this time, the copy NPC is deleted from the field, and the player character belongs to the party instead. The experience value obtained by the copy NPC within the given period is added to the experience value of the player character at the time of time-out registration when the game is resumed.

Regarding a copy NPC which has become a normal NPC this way, the player character of the original copy NPC becomes off-line again, the normal NPC does not have any relation with the player character even if the normal NPC has the same level, parameter, so forth as the player character. When the log-out process is performed again and the registration is updated, therefore, the experience value of every copy NPC which is added in the later log-in process is directed to the experience value of a new copy NPC generated based on the newly updated registration.

The following describes the movement of a copy NPC which is decided by the server apparatus 200 and the movement of an autopilot PC which is decided by the video game apparatus 100. The movements which are decided by the server apparatus 200 and the video game apparatus 100 differ in the subject to be moved, but do not differ in procedures of deciding the movements. The movements include a movement associated with traveling and a movement associated with a battle. The movement associated with traveling is basically decided so as to follow up another player character in the party to which a copy NPC and an autopilot PC belong, and may be decided based on the information on the progress of the game received from the server apparatus 200.

The movement associated with a battle is decided from movements of the player character which have been selected so far by the player according to the information on the progress of the game received from the server apparatus 200 in an on-line state, based on the latest 100 movements. There are plural types of movements of the player character which are selected by the player in a battle, and those movements are stored in each of the server apparatus 200 and the video game apparatus 100. The movements of a copy NPC and an autopilot PC are analyzed and decided based on the selection of the stored movements.

Such a movement is decided from an action log of a player character until the time of registration (the time of registration normal registration) for a copy NPC, and is decided from an action log of the player's own player until the execution of the autopilot operation by the player. In case of the time-out registration and the pseudo normal registration, a player character moves as an autopilot PC immediately before the player character is registered, so that the movement of the player character, like that of the immediately previous autopilot PC, is decided from the action log of the player's own player character until the execution of the autopilot operation.

The following describes data which is managed by the server apparatus 200 and data stored in the video game apparatus 100 in order to progress with the network game according to the embodiment.

FIG. 4A shows a player character management table 400 for managing data on players and the player's own player character who participate in the network game according to the embodiment. FIG. 4B shows a registered-character management table 410 for managing data on registration of player characters. FIG. 4C shows an NPC management table 420 for managing data on NPCs present on a field. FIG. 4D shows a parity management table 430 managing data on party-forming player characters for each party.

The player character management table 400 shown in FIG. 4A manages player character IDs 401, password information 402, addresses 403, an on-line flag 404, an autopilot flag 405, position information 406, level information 407, various parameters information 408, and experience value information 409. The player character ID 401 is identification information for identifying the position of each character present on a field.

The password information 402 is used to verify a player who moves a player character. The server apparatus 200 verifies if the combination of a player character ID 401 and password information 402 which are transmitted from the video game apparatus 100 by the player is correct to thereby verify if the player is the proper player to move the player character corresponding to the player character ID 401.

The address 403 is an IP address assigned to specify a video game apparatus 100 which manipulates an individual player. The on-line flag 404 indicates whether the video game apparatus 100 associated with the player character is connected on-line. When the video game apparatus 100 is on-line, the on-line flag 404 is ON (1), and when the video game apparatus 100 is off-line, the on-line flag 404 is OFF (0). The on-line flag 404 is updated by a log-in process or log-out process.

The autopilot flag 405 indicates whether the player character is an autopilot PC. When the player character is an autopilot PC, the autopilot flag 405 is ON (1), and when the player character is not an autopilot PC, the autopilot flag 405 is OFF (0). The position information 406 indicates the position of a character on a field. With regard to a player character, the position information 406 is updated according to a traveling operation performed by the player. When the player character is an autopilot PC, the position information 406 is updated according to a movement which is decided by the server apparatus 200 (traveling movement following up a player character belonging to the party).

The level information 407 indicates the level of the player character, and is updated when the experience value becomes a predetermined value. The various parameters information 408 stores various parameters of the player character, and is updated according to the progress of a battle or the like, or according to an increase in level. The experience value information 409 indicates the value of the experience value which a character has obtained so far, and is updated every time an experience value is obtained through a battle, or when there is an experience value added at the time of a log-in process. Though not shown in FIG. 4A, the player character management table 400 manages an action log for every player character to be managed.

The registered-character management table 410 shown in FIG. 4B stores player character IDs 411, an on-line flag 412, an acceptance disable flag 413, location-of-registration information 414, number-of-copies information 415, and accumulated experience value information 416. The player character ID 411 is identification information which can uniquely specify a player character. The player character ID 411 is the same information as the player character ID 401 stored in the player character management table 400 shown in FIG. 4A, and corresponds one to one to the player character management table 400.

The on-line flag 412 is the same information as the on-line flag 404 stored in the player character management table 400, and indicates whether the player character is on-line (flag ON (1)), or off-line (flag OFF (0)). The acceptance disable flag 413 is information indicating whether a copy NPC can be generated from the registered player character (flag ON (1)), or cannot be generated therefrom (flag OFF (0)). Normally, the acceptance disable flag 413 is updated to "1" when the player character registration operation becomes on-line, and is updated to "0" when the player character registration operation becomes off-line. When the player character registration operation becomes off-line after a time-out period elapses, however, the acceptance disable flag 413 is not updated to "0" unless an acceptance disable period elapses thereafter.

The location-of-registration information 414 indicates the position of the location of acceptance of registration on a field where the player character has been registered. The location-of-registration information 414 is updated with positional information on the location of acceptance of registration where a normal registration by the player has been done, or a pseudo normal registration originating from a normal registration by a player belonging to the same party has been done in case that the player character is an autopilot PC.

The number-of-copies information 415 indicates the number of copy NPCs generated. The number-of-copies information 415 is incremented every time a copy NPC is generated by execution of the player character copying operation with the registered player character being off-line, and is decremented by disappearance of the party to which the copy NPCs belong. In the log-in process of a player character associated with a copy NPC, the copy NPC is replaced with a normal NPC or a player character, the number-of-copies information 415 is updated (reset) to "0".

The accumulated experience value information 416 stores an experience value obtained by a copy NPC when the registered player character is off-line. The accumulated experience value information 416 is added and updated with an experience value obtained by the copy NPC upon deletion of the copy NPC resulting from disappearance of the party, and is updated (reset) to "0" in a log-in process associated with the registered player character.

The NPC management table 420 shown in FIG. 4C stores NPC IDs 421, player character IDs 422, a copy NPC flag 423, position information 424, various parameters information 425, and experience value information 426. In the NPC management table 420, generation of a copy NPC adds a record, and deletion of a copy NPC or a normal NPC causes a record associated with that NPC to be deleted.

The NPC ID 421 is identification information which uniquely specifies an NPC, and information which does not match with the player character IDs 401, 411 associated with the player characters shown in FIGS. 4A and 4B is set to the NPC ID 421. When an NPC is a copy NPC, the player character ID 422 stores the player character ID 411 of the registered player character which is the base of the copy NPC. When the copy NPC becomes a normal NPC at the time of the log-in process, the player character ID 411 is deleted, whereas when the NPC keeps being a normal NPC, the information of the player character ID 422 becomes invalid (NULL).

The copy NPC flag 423 indicates whether an NPC is a copy NPC or a normal NPC. When an NPC is a copy NPC, the copy NPC flag 423 is ON (1), and when an NPC is a normal NPC, the copy NPC flag 423 is OFF (0). The position information 424 indicates the position of an NPC on a field, and is updated according to the movement which is decided by the server apparatus 200 (traveling movement following up a player character belonging to the party).

The various parameters information 425 stores various parameters of an NPC, including what is updated according to the progress of a battle or the like. Because the level of an NPC does not increase, the parameters are not updated by an increase in level. The experience value information 426 is information indicating the value of the experience value which has been obtained through battles so far. Regarding a copy NPC, the experience value information 426 is updated with a value added with the experience value which is distributed for each battle until the copy NPC is deleted or until the time of performing a log-in process associated with the registered player character which is the base of the copy NPC. Regarding a normal NPC, the experience value information 426 is not updated even when the experience value is distributed for each battle, and becomes invalid (NULL). Though not shown in FIG. 4C, the NPC management table 420 manages an action log for every NPC to be managed. When an NPC is a copy NPC, or when a copy NPC becomes a normal NPC, the action log of the player character which is the base of that NPC is copied directly.

The parity management table 430 shown in FIG. 4D stores party IDs 431, party-forming player character information 432 and party-forming NPC information 433. The party ID 431 is identification information which uniquely identifies a party present on a field. The party-forming player character information 432 stores at least one player character ID of a player character among characters forming a party. While the party-forming NPC information 433 can store a plurality of NPC IDs of NPCs among characters forming a party, the information becomes invalid (NULL) when there is no NPC in the party.

Figure 5:
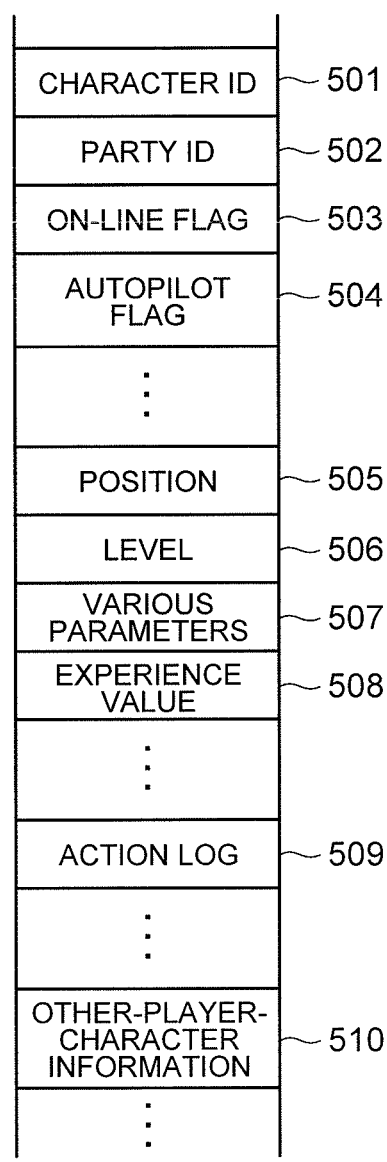
FIG. 5 is a diagram showing the structure of data to be stored in the video game apparatus shown in FIGS. 1 and 2.

FIG. 5 is a diagram showing the structure of data to be stored in the video game apparatus 100. Stored in the RAM 105 or the HDD 107 of the video game apparatus 100 are character IDs 501, a party ID 502, an on-line flag 503, an autopilot flag 504, position information 505, level information 506, various parameters information 507, experience value information 508, action log information 509, and other-player-character information 510.

The character ID 501 is unique to a player character which is moved by the player on the video game apparatus 100 where the character ID 501 is stored, and corresponds to the player character ID 401 in the player character management table 400 shown in FIG. 4A and the player character ID 411 in the registered-character management table 410 shown in FIG. 4B. The character ID 501 and the player character ID 401 uniquely specify a field, a player character on a battle field, and the video game apparatus 100 which moves the player character, and the character ID 501 and the player character ID 411 uniquely specify information on a registered player character and the video game apparatus 100 which is manipulated by a player who has performed a player character registration operation.

The party ID 502 is identification information for a party which is composed of the player character which is moved by this video game apparatus 100 as a member, and corresponds to the party ID 431 stored in the parity management table 430 shown in FIG. 4D. This correlation can uniquely specify to which party the player character to be moved by the video game apparatus 100 belongs. The on-line flag 503 indicates whether the video game apparatus 100 is connected on-line to the server apparatus 200. When the video game apparatus 100 is on-line, the on-line flag 503 is ON (1), and when the video game apparatus 100 is off-line, the on-line flag 503 is OFF (0).

The autopilot flag 504 indicates whether the player character to be moved by the video game apparatus 100 is an autopilot PC. When the player character is an autopilot PC, the autopilot flag 504 is ON (1), and when the player character is not an autopilot PC, the autopilot flag 504 is OFF (0). The position information 505, the level information 506, the various parameters information 507 and the experience value information 508 (hereinafter referred to as "game information") are information having the same contents as game information including the position information 406, the level information 407, the various parameters information 408 and the experience value information 409 which are stored in the player character management table 400 shown in FIG. 4A. With the video game apparatus 100 being on-line, exchange of those pieces of information between the video game apparatus 100 and the server apparatus 200 keeps those pieces of information in a non-contradictory state in the progress of the game.

The action log information 509 stores the action log of the player character which is moved on the video game apparatus 100. The other-player-character information 510 stores information, such as various parameters information and information on action modes or the like of other player characters in the party to which the player's own player character belongs, and includes data needed to display other characters (player characters, NPCs, and an opponent character) on the display screen 122 by each video game apparatus 100.

Figure 6:
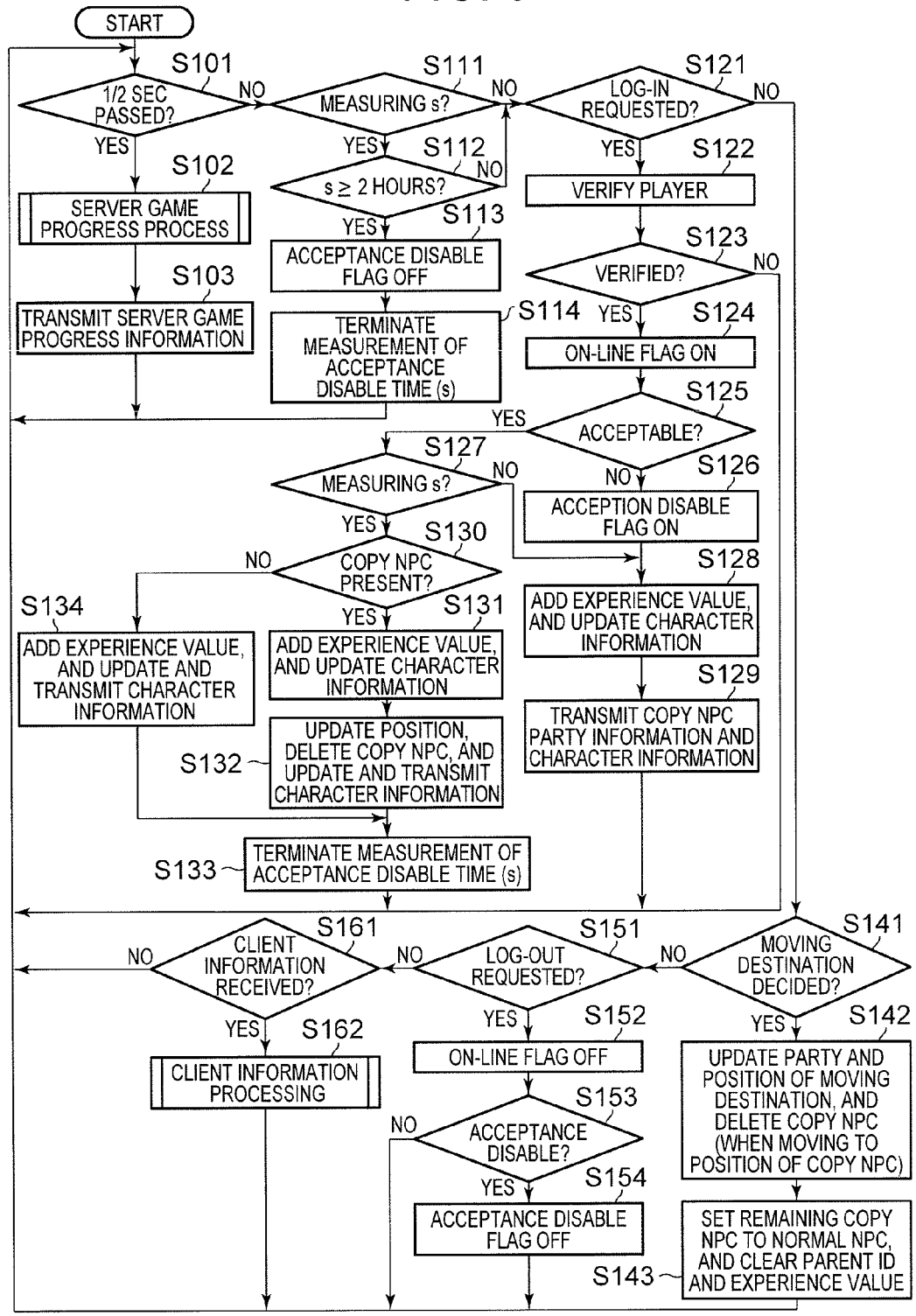
FIG. 6 is a flowchart illustrating a routine which is executed by the server apparatus.
Figure 7:
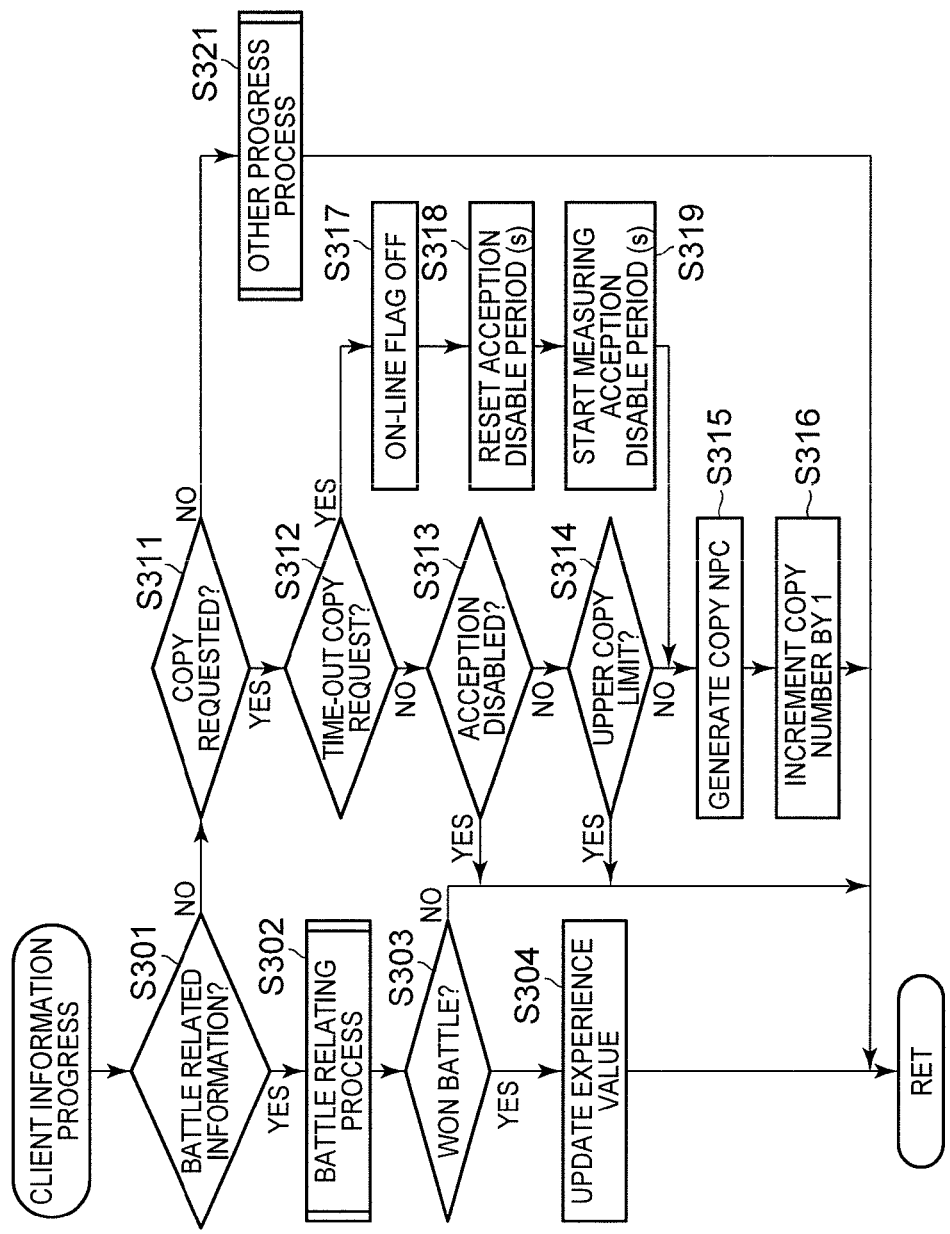
FIG. 7A is a flowchart illustrating a server game progress process in FIG. 6 in detail.
FIG. 7B is a flowchart illustrating client information processing in FIG. 6 in detail.

The following describes a routine which is executed by the network game system according to the embodiment. FIGS. 6 and 7 present flowcharts illustrating routines which are executed by the server apparatus 200 according to the embodiment. The routines which are executed by the server apparatus 200 include processes other than the steps illustrated in the flowcharts in FIGS. 6 and 7, which particularly illustrate the steps which are executed in connection to the invention.

As shown in FIG. 6, the control unit 203 of the server apparatus 200 determines whether ½ second has passed since the initiation of the game or since the previous elapsing of ½ second (step S101). When having determined that ½ second has passed, the control unit 203 executes a server game progress process (step S102). The server game progress process is a process to progress with the game which is executed by the server apparatus 200. For example, this process determines and executes movements of an NPC, an opponent character, etc., and updates information which is changed according to the result.

The control unit 203 transmits information updated based on information input by the player of a video game apparatus 100 in an on-line state, together with the information update in the server game progress process, as server game progress information to all the on-line video game apparatuses 100 (step S103). Then, the control unit 203 returns to the process of step S101.

When having determined in step S101 that ½ second has not passed, the control unit 203 determines whether there is at least one registered player character whose acceptance disable period (s) is measured by an internal timer (hereinafter referred to as "temporarily acceptance disabled character") (step S111). When having determined that there is at least one temporarily acceptance disabled character, the control unit 203 determines whether the temporarily acceptance disabled characters include a temporarily acceptance disabled character whose acceptance disable period measured is equal to or greater than 2 hours (step S112).

When having determined that there is a temporarily acceptance disabled character whose acceptance disable period measured is equal to or greater than 2 hours, the control unit 203 sets the acceptance disable flag OFF (step S113). The control unit 203 terminates measurement of the acceptance disable period for the temporarily acceptance disabled character (step S114), and returns to the process of step S101.

When having determined in step S111 that there is no temporarily acceptance disabled character, or when having determined in step S112 that there is not any temporarily acceptance disabled character whose acceptance disable period measured is equal to or greater than 2 hours, the control unit 203 determines whether the information on making a request for a log-in process (hereinafter referred to as "log-in request information") transmitted from the video game apparatus 100 is received (step S121). When having determined that the log-in request information is received, the control unit 203 compares the player character ID and password included in the log-in request information with the player character ID 401 and the password information 402 associated with this player character, stored in the player character management table 400, to verify the player who manipulates the video game apparatus 100 (step S122).

The control unit 203 determines whether the player has been verified as a proper player qualified to participate in the game as a result of the decision in step S122 (step S123). When having determined that the player has been verified, the control unit 203 sets the on-line flag stored in the player character management table 400 ON for the player character which is moved by the player (step S124). When having determined that the player has not been verified, the control unit 203 returns to the process of step S101.

After setting the on-line flag ON, the control unit 203 determines the acceptance disable flag 413 stored in the registered-character management table 410 and indicating whether the player character is not acceptable (step S125). When having determined that the acceptance disable flag 413 is OFF, the control unit 203 sets the acceptance disable flag 413 ON (step S126) and proceeds to step S128. When having determined in step S125 that the acceptance disable flag 413 is ON, the control unit 203 determines whether the player character associated with the verification is a temporarily acceptance disabled character by means of the internal timer (step S127). When having determined that the player character is not a temporarily acceptance disabled character, the control unit 203 proceeds to step S128.

In step S128, when there is a copy NPC which is copied based on the registered player character of the verified player at the time the verification has been performed, the control unit 203 adds up the experience value obtained by the copy NPC which is stored in the NPC management table 420 and the accumulated experience value information 416 stored in the registered-character management table 410, and adds the total experience value to the experience value information 409 of the verified player character which is stored in the player character management table 400 (step S128). When the experience value information 409 becomes a predetermined value at which the level of the player character moves up at this time, the control unit 203 updates the level information 407 to be stored in the player character management table 400, and updates the various parameters information 408 if the increase in level increases a parameter.

When there is a copy NPC, the control unit 203 extracts information on a party to which the copy NPC belongs (hereinafter referred to as "copy NPC party information") from the parity management table 430, and transmits the extracted information, together with the updated level information on the player character, various parameters information, etc. (hereinafter referred to as "character information in log-in mode"), to the video game apparatus 100 which is manipulated by the verified player (step S129). Then, the control unit 203 returns to the process of step S101.

When having determined in step S127 that the player character associated with verification is a temporarily acceptance disabled character, the control unit 203 determines whether there is a copy NPC (step S130). When having determined that there is a copy NPC, the control unit 203 adds the experience value obtained by the copy NPC in the acceptance disable period to the experience value information 409 of the player character at the time of time-out registration to be stored in the player character management table 400, updates the level information 407 to be stored in the player character management table 400 when the experience value information 409 of the player character becomes a predetermined value at which the level of the player character moves up, and updates the various parameters information 408 if the increase in level increases a parameter (step S131).

Because it is the acceptance disable period when the log-in process is carried out, the number of copy NPCs is only one. After step S131, therefore, the control unit 203 adds the character ID associated with the copy NPC to the party-forming player character information 432 in the parity management table 430 for the party to which the copy NPC belongs, and deletes the copy NPC from the party-forming NPC information 433 (step S132). The control unit 203 updates the position information 406 to be stored in the player character management table 400 and associated with the verification to information on the position in which the copy NPC has been present, and transmits the updated information together with the character information in log-in mode to the video game apparatus 100 associated with the verification. The control unit 203 terminates measurement of the acceptance disable period for the player character (step S133), and returns to the process of step S101.

When having determined in step S130 that there is no copy NPC, the is updated adds the accumulated experience value information 416 obtained by the copy NPC which has been deleted before the verification and stored in the registered-character management table 410 to the experience value information 409 of the player character at the time of time-out registration to be stored in the player character management table 400, updates the level information 407 to be stored in the player character management table 400 when the experience value information 409 becomes a predetermined value at which the level of the player character moves up, and updates the various parameters information 408 and transmits the updated information together with the character information in log-in mode if the increase in level increases a parameter (step S134). Then, the control unit 203 executes the process of step S133, and returns to the process of step S101.

When having determined in step S121 that the log-in request information is not received, the control unit 203 determines whether information associated with selection of a party or a position at the time of resuming the game (hereinafter referred to as "moving destination determining information") is received from the video game apparatus 100 (step S141). When having determined that the moving destination determining information is received, the control unit 203 updates the position information 406 included in the moving destination determining information and to be stored in the player character management table 400 for the player character of the player who is attempting to resume the game (step S142).

When a party is selected as a location of resuming the game, the control unit 203 adds the character ID of the player character to the party-forming player character information 432 to be stored in the parity management table 430 for this party, and deletes the copy NPC which is generated from the player character (copy NPC for which the player character ID of the player character is the same as the player character ID 422 in the NPC management table 420) from the party-forming NPC information 433.

When there is a remaining copy NPC generated from the player character, the control unit 203 sets the copy NPC flag 423 in the NPC management table 420 OFF, ad clears the player character ID 422 and the experience value information 426 (step S143). Then, the control unit 203 returns to the process of step S101.

When having determined in step S141 that the moving destination determining information is not received, the control unit 203 determines whether information on a request for the log-out process for the player character transmitted from the video game apparatus 100, and information on setting of whether the player permits copying of the registered player character (hereinafter referred to as "log-out request information") (step S151). When having determined that the log-out request information is received, the control unit 203 sets OFF both the on-line flag 404 and the on-line flag 412 to be respectively stored in the player character management table 400 and the registered-character management table 410 for the player character of the player (step S152).

The control unit 203 determines whether the information associated with permission of copying the registered player character included in the log-out request information will permit copying or not (step S153). When having determined that the information indicates permission of copying, the control unit 203 sets OFF the acceptance disable flag 413 to be stored in the registered-character management table 410 for the player character (step S154). When having determined in step S153 that the information does not indicate permission of copying, or after step S153, the control unit 203 returns to the process of step S101.

When having determined in step S151 that the log-out request information is not received, the control unit 203 determines whether information on an input relating to a battle, a request for generation of a copy NPC, or the like transmitted from the video game apparatus 100 (hereinafter referred to as "client information") is received (step S161). When having determined that the client information is received, the control unit 203 executes a battle relating process based on the input relating to a battle, or a client information process for performing a process of generating a copy NPC based on the manipulation of the player character (step S162). The client information process will be described in detail later. Then, the control unit 203 returns to the process of step S101.

In the server game progress process as shown in FIG. 7A, the control unit 203 determines whether there is any copy NPC which has not undergone a determination as to whether or not to move the copy NPC, and as to what movement the copy NPC should take if the copy NPC is to be moved (hereinafter referred to as "unprocessed copy NPC") (step S201). When having determined that there is an unprocessed copy NPC, the control unit 203 decides the movement of the copy NPC according to information on the progress of the game based on the action log of the player character relating to one copy NPC among such unprocessed copy NPCs, and updates information on various parameters or the like of each character which vary according to the movement (step S202).

The control unit 203 determines whether the result of the movement of the copy NPC will result in winning of the battle (step S203). When having determined that the battle is won, the control unit 203 equally divides the experience value obtained through the winning of the battle by the number of party characters to which the copy NPC belongs, and adds the divided experience value to the experience value of a character other than a normal NPC for update (step S204). Specifically, the experience value equally divided by the number of party characters is added to the experience value information 409 to be stored in the player character management table 400 for an autopilot PC, or the experience value information 409 to be stored in the NPC management table 420 for a copy NPC. Then, the control unit 203 returns to the process of step S201. When having determined in step S203 that the battle is not wont, the control unit 203 also returns to the process of step S201.

When having determined in step S201 that an unprocessed copy NPC is not present, the control unit 203 executes a process or the like relating to a determination on the movement of a normal NPC, an opponent character or the like as another game progress process (step S205). Since this process is not related to the invention, its description is omitted.

In the client information process of the server apparatus 200, as shown in FIG. 7B, the control unit 203 determines whether the received client information is information associated with an input related to a battle (hereinafter referred to as "battle relating process") (step S301). When the battle relating information is received, the control unit 203 executes a battle relating process such as update of various parameters information of the player character, based on the input information (step S302). Since the battle relating process is not related to the invention, its description is omitted.

The control unit 203 determines whether the result of the battle relating process will result in winning of the battle (step S303). When having determined that the battle is won, the control unit 203 equally divides the experience value obtained through the winning of the battle by the number of characters forming the party to which the copy NPC belongs, and adds the divided experience value to the experience value of a character other than a normal NPC for update (step S304). The details of the process are the same as those of the process of step S204 in the server game progress process. Then, the control unit 203 terminates the client information process.

When having determined in step S303 that the battle is not wont, the control unit 203 also terminates the client information process.

When having determined in step S301 that the client information is not battle relating information, the control unit 203 determines whether the received client information is information relating to a request for generation of a copy NPC (hereinafter referred to as "copy request information") (step S311). When having determined that the client information is copy request information, the control unit 203 determines whether the copy request information relates to a request for generation of a copy NPC at the time of time-out registration (hereinafter referred to as "time-out copy request information") (step S312). When having determined that the copy request information is not time-out copy request information, the control unit 203 decides that the time-out copy request information relates to a player character copying operation, and determines whether a copy NPC can be generated for the registered player character which is the target for the generation of the copy NPC based on the acceptance disable flag 413 to be stored in the registered-character management table 410 (step S313).

When having determined that a copy NPC can be generated, the control unit 203 determines whether the upper limit of the number of copy NPCs which can be generated for the target registered player character based on the number-of-copies information 415 to be stored in the registered-character management table 410 (step S314). When having determined that the number-of-copies information 415 is not the upper limit, the control unit 203 generates a copy NPC according to the copy request information (step S315). The control unit 203 increments the number-of-copies information 415 to be stored in the registered-character management table 410 by "1" for the registered player character whose copy NPC has been generated (step S316). Then, the control unit 203 terminates the client information process. When having determined in step S313 that a copy NPC cannot be generated, or when having determined in step S314 that the number-of-copies information 415 is the upper limit, the control unit 203 also terminates the client information process.

When having determined in step S312 that the copy request information is time-out copy request information, the control unit 203 sets OFF the on-line flag 404 to be stored in the player character management table 400 and the on-line flag 412 to be stored in the registered-character management table 410 for the player character which is moved by the video game apparatus 100 to which the time-out copy request information has been transmitted (step S317). The control unit 203 resets the acceptance disable period s for the registered player character (step S318), then starts measuring the acceptance disable period s (step S319), and executes the processes of steps S315 and S316. Then, the control unit 203 terminates the client information process.

When having determined in step S311 that the client information is not copy request information, the control unit 203 executes another game process based on information which is not battle relating information or copy request information (step S321). Then, the control unit 203 terminates the client information process.

Figure 8:
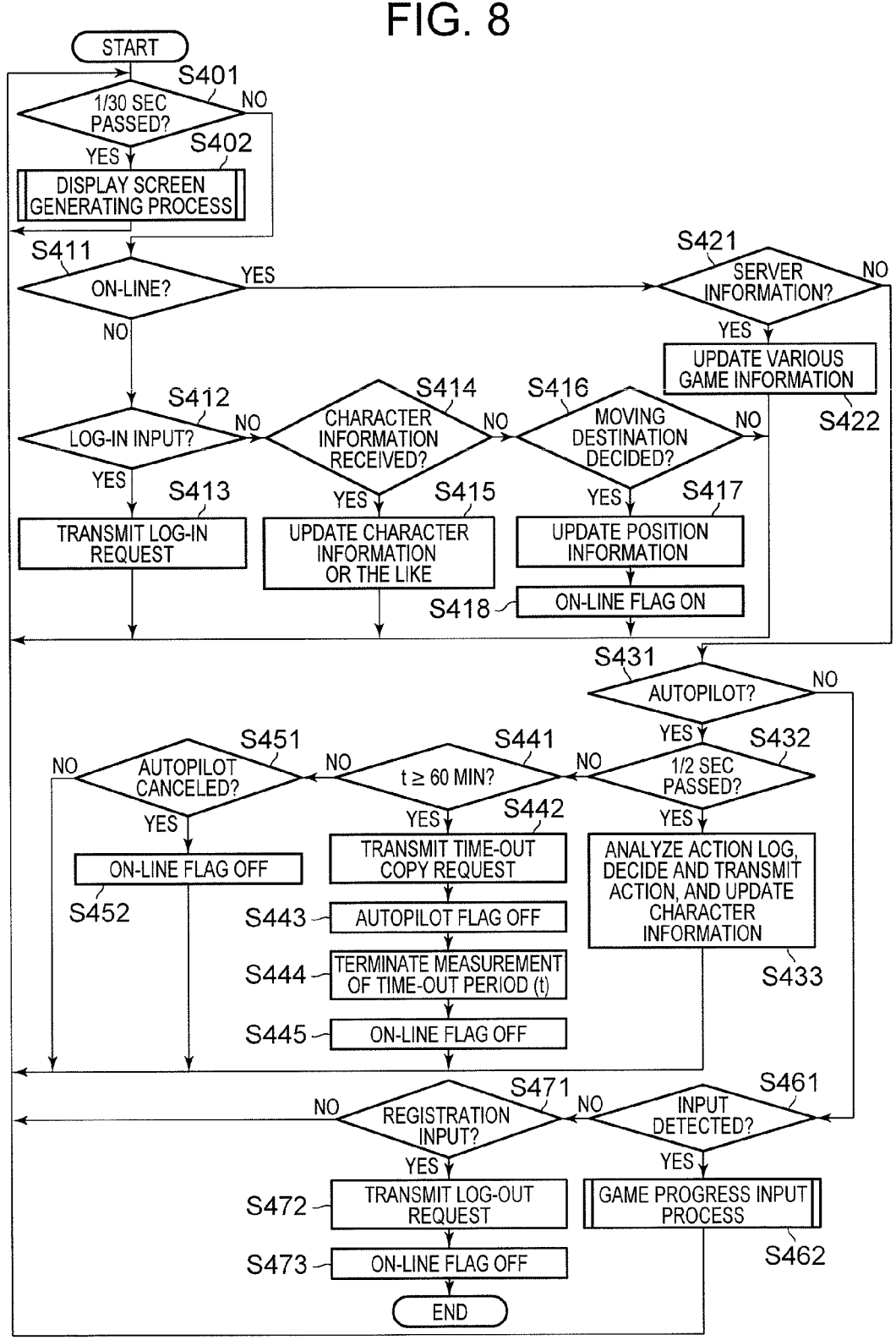
FIG. 8 is a flowchart illustrating a routine which is executed by the video game apparatus.
Figure 9:
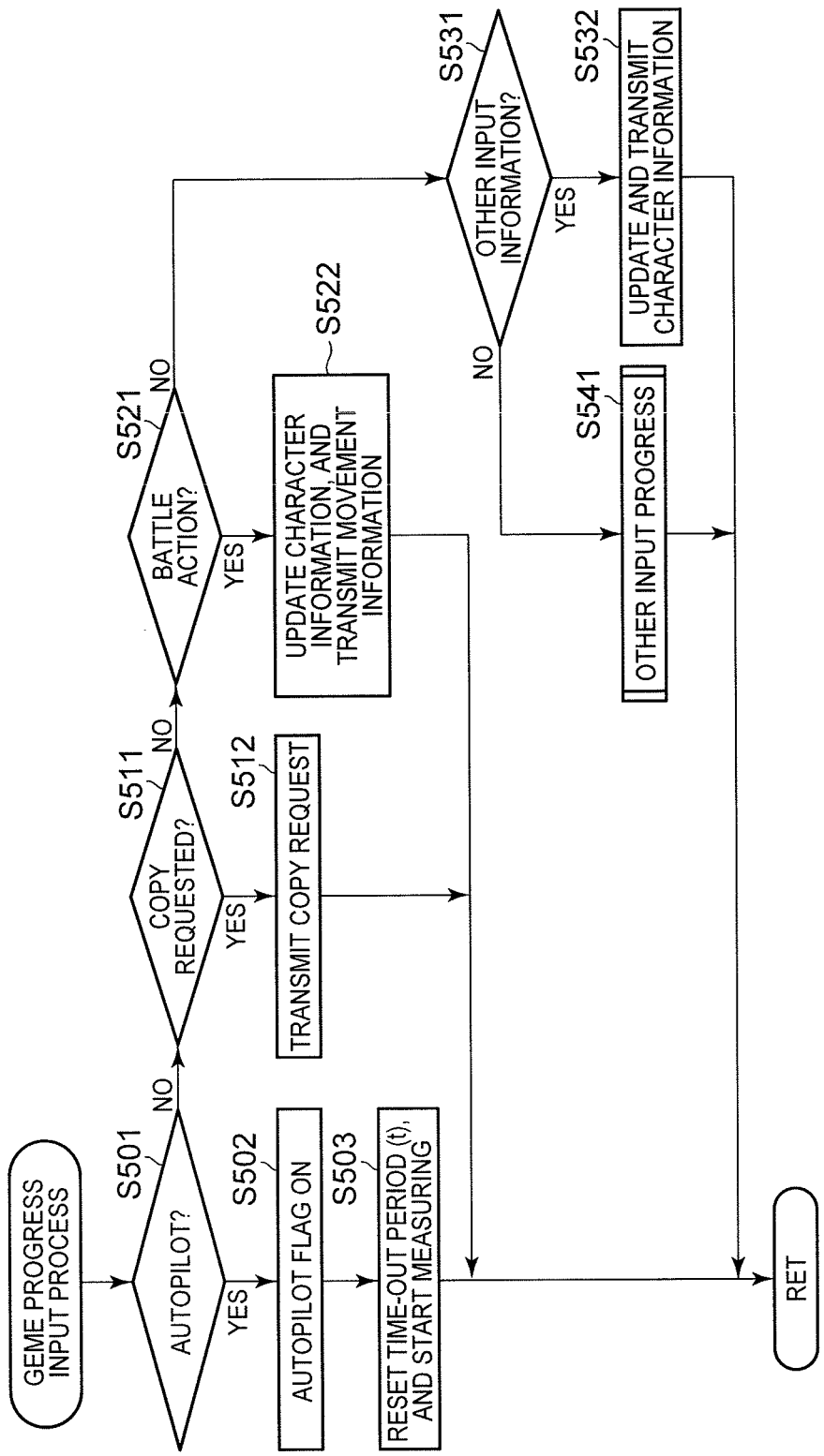
FIG. 9 is a flowchart illustrating a game progress input process in FIG. 8 in detail.

FIGS. 8 and 9 present flowcharts illustrating routines which are executed by the video game apparatus 100 according to the embodiment. The routines which are executed by the video game apparatus 100 include processes other than the steps illustrated in the flowcharts in FIGS. 8 and 9, which particularly illustrate the steps which are executed in connection to the invention.

As shown in FIG. 8, the control unit 103 of the video game apparatus 100 determines whether $1/30$ second has passed since the initiation of the game or since the previous elapsing of $1/30$ second (step S401). When having determined that $1/30$ second has passed, the control unit 103 generates an image to be displayed on the display screen 122 based on a position associated with the player character which is moved by the video game apparatus 100, the other-player-character information 510 to be stored in the video game apparatus 100 and the like (step S402). Since the process relating to generation of an image is not related to the invention, its description is omitted. Then, the control unit 103 returns to the process of step S401.

When having determined in step S401 that $1/30$ second has not passed, the control unit 103 determines whether the video game apparatus 100 is on-line (step S411). When having determined that the video game apparatus 100 is on-line, the control unit 103 determines whether input information relating to an operation for the player to perform a log-in process is detected (step S412). When having determined that the input information is detected, the control unit 103 transmits log-in request information to the server apparatus 200 (step S413). Then, the control unit 103 returns to the process of step S401.

When having determined in step S412 that input information relating to the operation for the log-in process is not detected, the control unit 103 determines whether the character information in log-in mode transmitted from the server apparatus 200 is received (step S414). When having determined that the character information in log-in mode is not received, the control unit 103 updates the level information 506, the various parameters information 507, etc. to be stored in the video game apparatus 100, based on the character information in log-in mode (step S415). Then, the control unit 103 returns to the process of step S401.

When having determined in step S414 that the character information in log-in mode is not received, the control unit 103 determines whether input information relating to an operation representing that the player has decided from which one of a party to which a copy NPC belongs, or a position in which the player's own player character has been registered, each received together with the character information in log-in mode and included in the copy NPC party information, the game will be resumed (the operation being hereinafter referred to as "moving destination determining operation") is detected (step S416). When having determined that the input information is detected, the control unit 103 updates the position information 505 to be stored in the video game apparatus 100 with the information on the decided position, and transmits the updated information to the server apparatus 200 as moving destination determining information (step S417). The control unit 103 sets the on-line flag 503 ON (step S418), and returns to the process of step S401. When having determined in step S416 that input information relating to the moving destination determining operation is not detected, the control unit 103 returns to the process of step S401.

When having determined in step S411 that the video game apparatus 100 is on-line, the control unit 103 determines whether the server game progress information is received from the server apparatus 200 (step S421). When having determined that server game progress information is received, the control unit 103 updates the various parameters information 507, the other-player-character information 510, etc. to be stored in the video game apparatus 100 with the information updated in the server game progress process included in the server game progress information (step S422), and returns to the process of step S401.

When having determined in step S421 that the server game progress information is not received, the control unit 103 determines whether the player character is an autopilot PC based on the autopilot flag 504 (step S431). When having determined that the player character is an autopilot PC, the control unit 103 determines whether ½ second has passed since the initiation of the game or since the previous elapsing of ½ second (step S432). When having determined that ½ second has passed, the control unit 103 determines the movement of the autopilot PC according to information on the progress of the game based on the action log information 509 of the player character, transmits the information on the movement to the server apparatus 200, and updates the various parameters information 507 or the like which is changed by the movement (step S433). Then, the control unit 103 returns to the process of step S401.

When having determined in step S432 that ½ second has not passed, the control unit 103 determines whether the time-out period has been measured for 60 minutes or longer (step S441). When having determined that the time-out period has been measured for 60 minutes or longer, the control unit 103 transmits time-out copy request information (step S442). The control unit 103 sets the autopilot flag 504 to be stored in the video game apparatus 100 OFF (step S443), and terminates measurement of the time-out period (step S444). The control unit 103 sets the on-line flag 503 to be stored in the video game apparatus 100 OFF (step S445), and returns to the process of step S401.

When having determined in step S441 that the time-out period has not been measured for 60 minutes or longer, the control unit 103 determines whether input information relating to an autopilot cancel operation by the player is detected (step S451). When having determined that the input information is detected, the control unit 103 sets the autopilot flag 504 to be stored in the video game apparatus 100 OFF (step S452). Then, the control unit 103 returns to the process of step S401. When having determined in step S451 that input information relating to the autopilot cancel operation is not detected, the control unit 103 returns to the process of step S401.

When having determined in step S431 that the player character is not an autopilot PC, the control unit 103 determines whether input information, such as an operation relating to the progress of the game, an autopilot operation, or a player character copying operation, by the player (hereinafter referred to as "game progress input information") is detected (step S461). When having determined that there is game progress input information, the control unit 103 performs a game progress input process (step S462). The details of the game progress input process will be given later. When the game progress input process is terminated, the control unit 103 returns to the process of step S101.

When having determined in step S461 that game progress input information is not detected, the control unit 103 determines whether input information relating to the player character registration operation by the player is detected (step S471). When having determined that input information relating to the player character registration operation is detected, the control unit 103 transmits log-out request information to the server apparatus 200 (step S472), and sets the on-line flag 503 OFF (step S473). Then, the control unit 103 terminates the process on the video game apparatus 100. When having determined in step S471 that input information relating to the player character registration operation is not detected, the control unit 103 returns to the process of step S401.

In the game progress process of the video game apparatus 100, as shown in FIG. 9, the control unit 103 determines whether an input relating to an autopilot operation by the player is detected (step S501). When having determined that the input is detected, the control unit 103 sets the autopilot flag 504 to be stored in the video game apparatus 100 ON (step S502). The control unit 103 resets a time-out period (t) which is measured by the internal timer, and starts measuring the time-out period (t) (step S503). Then, the control unit 103 terminates the game progress process.

When having determined in step S501 that an input relating to the autopilot operation is not detected, the control unit 103 determines whether the an input relating to the player character copying operation by the player is detected (step S511). When having determined that the input is detected, the control unit 103 transmits copy request information to the server apparatus 200 (step S512). Then, the control unit 103 terminates the game progress process.

When having determined in step S511 that the input relating to the player character copying operation is not detected, the control unit 103 determines whether input information on the movement of the player's own player character relating to a battle is detected (step S521). When having determined that the input information is detected, the control unit 103 transmits the information on the movement of the player's own player character to the server apparatus 200, and updates the various parameters information 507 or the like which is changed by the movement (step S522).

The information on the movement of the player's own player character relating to a battle which is transmitted to the server apparatus 200 in step S522, and the information on the movement of an autopilot PC in step S433 differ from each other in that the player himself/herself moves the player's own player character while the control unit 103 moves the player's own player character, but should not be distinguished from each other as movement-relating information received by the server apparatus 200.

When having determined in step S521 that the input information on the player's own player character relating to a battle is not detected, the control unit 103 determines whether another input information generated by the player operating the input device 163 is detected (step S531). When having determined that the input information is detected, the control unit 103 updates the various parameters information 507 or the like to be stored in the video game apparatus 100, and transmits the information on the input operation to the server apparatus 200 (step S532). Then, the control unit 103 terminates the game progress process.

When having determined in step S531 that the input operation is not detected, the control unit 103 executes a game progressing process other than the foregoing processes on the video game apparatus 100 (step S541). Then, the control unit 103 terminates the game progress process.

The interaction on the process of an autopilot PC between individual objects is described in detail on the time-sequential basis. FIG. 10 is a sequence chart illustrating the interaction on an autopilot PC between individual objects.

The description is given, by way of example, of processes for the autopilot operation by the player, execution of the movement of an autopilot PC by the video game apparatus 100 until the autopilot cancel operation, and termination of the movement of the autopilot PC by the video game apparatus 100 as a result of elapsing of a predetermined period (60 minutes) after the initiation of the movement of the autopilot PC through the autopilot operation by the player, and execution of the movement of a copy NPC by the server apparatus 200 thereafter.

Although the process relating to an autopilot PC is the process to be executed when the player character forms a party with the player characters of other players, the video game apparatus 100 which moves other player characters is not particularly elaborated.

When the player performs an autopilot operation using the input device 163 of the on-line video game apparatus 100, the control unit 103 of the video game apparatus 100 moves the player character as an autopilot PC in response to the operation (sequence SQ1). Then, when the player performs an autopilot cancel operation thereafter using the input device 163, the control unit 103 cancels the movement of the player character as an autopilot PC in response to the autopilot cancel operation, and moves the player character according to the manipulation on the input device 163 performed by the player. Even when an operation other than the autopilot cancel operation is performed during this period, the control unit 103 keeps moving the player character as an autopilot PC.

In response to the autopilot operation by the player again, the control unit 103 moves the player character as an autopilot PC (sequence SQ2). When 60 minutes (time-out period) passes thereafter without any autopilot cancel operation performed by the player, the control unit 103 executes a log-out process to set the video game apparatus 100 off-line (sequence SQ3). At this time, the control unit 103 transmits time-out copy request information to the server apparatus 200 (sequence SQ4).

When the server apparatus 200 receives the time-out copy request information, the control unit 203 of the server apparatus 200 generates a copy NPC which is moved by the server apparatus 200 (sequence SQ5). Since the video game apparatus 100 becomes off-line at this time, the player character which has been moved by the video game apparatus 100 is deleted, and the copy NPC belongs to the party to which the player character has belonged instead. Thereafter, the control unit 203 of the server apparatus 200 performs the movement of the copy NPC until the party to which the copy NPC belongs disappears (sequence SQ6).

In the network game system according to the embodiment, as described above, at the time of performing a log-out process in the game, the player registers the player's own player character by performing a player character registration operation. When the player character is registered, and the video game apparatus 100 which is manipulated by the player becomes off-line, another player who manipulates an on-line video game apparatus 100 can generate a copy NPC of the player character by performing a player character copying operation.

At this time, the movement of the copy NPC or movements including a movement in a battle are determined by the server apparatus 200. Accordingly, even when the video game apparatus 100 is off-line, and the player who manipulates this video game apparatus 100 cannot move the player's own player character in the game which is managed by the server apparatus 200, a copy NPC based on the player character can be moved according to the progress of the game. This allows a player manipulating an on-line video game apparatus 100 to feel as if the player is playing the game with the registered player character in the progress of the game. Therefore, the player can play the game in his/her own pace of life with other players without being forced to match each play timing of the game in real time.

In performing the player character registration operation, the player can set whether or not to permit other players to generate a copy NPC based on the player's own player character in a period in which the video game apparatus which is manipulated by the player is off-line, thus preventing the game to progress through the movement of the copy NPC based on the player's own player character of which the player cannot be aware.

When the video game apparatus 100 which the player manipulates is on-line to play the game, the player can move the player's own player character as an autopilot PC without depending on the player's manipulation on the input device 163. At this time, the movement of the copy NPC or movements including a movement in a battle are determined by the video game apparatus 100 which is manipulated by the player of the player character. Accordingly, the player's own player character can be moved according to the progress of the game without involving the player's own manipulation, so that other players will not feel uncomfortable.

Because a player who moves the player's own player character as an autopilot PC can move the player's own player character according to the progress of the game without involving the player's own manipulation, the player can temporarily break away from playing the game at a desired timing in a middle of the progress of the game. Because the player's own player character is moved according to the progress of the game this way, the player's own player character is kept moving by the video game apparatus 100 even if the player temporarily breaks away from the game. This can permit the game to keep progressing in cooperation with other players forming the same party without causing the other players to wait for the breakaway player. It is possible to suppress the occurrence of troubles on the other players, thus suppressing ruining the relationship of trust with the other players.

When the player's own player character is moved as an autopilot PC, the player's own player character can be moved again based on the player's own manipulation by performing the autopilot cancel operation to depress a predetermined button on the input device 163 to cancel the autopilot operation. Because the movement information of the player's own player character as an autopilot PC is canceled by a predetermined cancel operation by the player, it is possible prevent the movement of the player character from being canceled unexpectedly to inhibit the player character from moving when the player does not temporarily manipulate the player's own player character himself/herself.

Battles-relating movements of the player's own player character which have been decided and selected by the player in the game are stored as the action log information 509 in the video game apparatus 100 which is manipulated by the player himself/herself. The action log information of the individual player characters is likewise stored in the player character management table 400 in the server apparatus 200 for each player character, and the action log information of a player character on which the former action log information is based is stored, as it is, in the NPC management table 420 together with various parameters information or the like.

Based on the action log information stored in this manner, the movements of a copy NPC and an autopilot PC in a battle are decided. Accordingly, the movement of the player character which is selected by the player is reflected on the movements of the copy NPC and the autopilot PC. Even a movement which is not directly based on the player's manipulation can reduce uncomfortable feeling of other players on the movements of the copy NPC and the autopilot PC.

When an opponent character can be defeated as a consequence of the movements of a copy NPC and an autopilot PC which are not directly based on the player's manipulation, the experience value obtained through a battle is equally divided by the number of members forming a party and the resultant value is added to the experience value of each of the copy NPC and the autopilot PC. Apparently, the experience value obtained as a consequence of a battle is obtained for an autopilot PC in a way similar to the normal way the player obtains it by manipulating the player character.

In case of a copy NPC, the experience value obtained by the copy NPC which is based on the player character that has been moved on the video game apparatus 100 while the video game apparatus 100 has been off-line is added to the experience value of the player character when the video game apparatus 100 becomes on-line. Even when the video game apparatus 100 on which the player character is moved is off-line, the feeling that the player character has been moved is obtained. A player who has fewer time to play the game can obtain an experience value, which makes the player's own player character stronger, while the player is not playing, so that the difference between the performances of player characters which is originated from the difference in play time can be reduced. This can suppress declining of the motivation for playing the game.

When one or more copy NPCs actually generated are present and have not been deleted at the time of performing a log-in process on the video game apparatus 100, executing the game resuming position selecting process makes it possible to resume the game from the position on a field where a single copy NPC selected by the player is present. Accordingly, even when the video game apparatus 100 the player manipulates is off-line, disabling the corresponding player character to move, the player character can be made to smoothly adapt itself to the progress of the game which has been made with the copy NPC, thereby reducing uncomfortable feeling of other players on the movement of the player character.

Even if the player attempts to forcibly move the player's own player character as an autopilot PC through the autopilot operation, when the time-out period of 60 minutes passes, the video game apparatus 100 which moves the player's own player character is forcibly set off-line. In general, when a player is not playing a network game on a corresponding video game apparatus 100 (is not making any input through the input device), there is not information to be transmitted to the server apparatus 200 from the video game apparatus 100, so that the server apparatus 200 determines that the game is not played on a video game apparatus 100 which has not transmitted information in a certain long duration, and causes the player of this video game apparatus 100 to break away from the game.

In the network game system according to the embodiment, an autopilot operation is performed, so that the video game apparatus 100 whose autopilot has not been canceled transmits information on the movement of the player character to the server apparatus 200 even when the player does not perform an input operation using the input device 163. This may prevent the player of the video game apparatus 100 from semipermanently leaving the game unless no measure thereagainst is taken. Of course, when the state of no input being made to the video game apparatus 100 continues for 60 minutes or longer, a request for time-out registration may be transmitted to make the player of the video game apparatus 100 leave the game as in the case where the player performs the player character registration operation to set the player's own video game apparatus 100 off-line.

When a log-out process is forcibly carried out when the time-out period passes, however, the player character which has been the autopilot PC is deleted, and a copy NPC generated based on this player character is caused to belong to the party to which the player character has belonged. Accordingly, even when the time-out period elapses with the player keeping the player's own player character moving as an autopilot PC, the character will not be deleted right away, but a copy NPC generated based on the player's own player character is moved, thus making it possible to prevent other players from feeling unnatural about the progress of the game. Because the player character does not become off-line and disappear from the party immediately, and a copy NPC to be generated is generated based on this player character, it is possible to avoid causing an inconvenience or a trouble on other players forming the party.

The invention is not limited to the foregoing embodiment, and is modifiable and applicable in various forms. Some modifications of the embodiment which are applicable to the invention will be described below.

According to the embodiment, each character obtains an experience value as a result of defeating an opponent character in a battle. The embodiment of the invention is not however limited to this particular case, but money may be obtained as a result of defeating an opponent character instead in addition to or in place of the experience value. In this case, the player can purchase equipment or an item to increase various parameters of the player character with money, and an item which increases a parameter more needs greater money.

To obtain a lot of money by defeating a stronger opponent character, the player can repeat battles to increase the money of the player's own player character to obtain a stronger item, thereby making the player's own player character stronger so that the player progresses with the game in order to defeat a stronger opponent character. In this manner, money can motivate the player in a way similar to what is motivated by the experience value.

According to the embodiment, when a player character is moving as an autopilot PC, the player cancels the movement of the autopilot PC by performing the autopilot cancel operation of depressing a predetermined button on the input device 163. The embodiment of the invention is not limited to this mode, and operating any button or any direction key provided on the input device 163, the player may be able to move the autopilot PC as a player character again. This scheme make is unnecessary for a player to think what kind of manipulation should be taken to cancel the movement of the player character as an autopilot PC, so that the player can quickly release the player's own player character from moving as an autopilot PC, so that the player's own player character can be moved by the player.

Although the player makes setting as to whether a registered player character is allowed to be copyable or not at the time of normal registration, a registered player character may be set to be copyable as the initial setting and copying thereof may be prohibited beforehand by selection made by the player.

According to the embodiment, the information on the movement of the player's own player character relating to a battle which is transmitted to the server apparatus 200 in step S522, and the information on the movement of an autopilot PC in step S433 should not be distinguished from each other as movement-relating information received by the server apparatus 200. However, the server apparatus 200 may discriminate that subject matters with their movements decided differ from each other.

According to the embodiment, the upper limit of the number of copy NPCs which can be generated for a single registered player character (hereinafter referred to as "number of generatable copy NPCs") is "50". However, the maximum number of generatable copy NPCs may not be set, or may be set a smaller number, such as "5" or "1".

According to the embodiment, all the experience values obtained by a generated copy NPC are added up and the total experience value is added to the experience value of the player character which is the base of the copy NPC when the video game apparatus 100 which moves the base player character of the copy NPC becomes on-line to resume the game. When the maximum number of generatable copy NPCs is not set, however, the upper limit of the total experience value may be set, so that an excess portion of the experience value may not be added to the experience value of the player character at the time of resuming the game.

When the maximum number of generatable copy NPCs is not set, the upper limit of only the number of copy NPCs whose experience values obtained are added up may be set. For example, in off-line mode, the total of the experience values of the first ten copy NPCs which have been generated in the off-line mode may be added to the experience value of the player character when the off-line mode ends and the game is resumed.

Further, a given proportion of the total of the experience values of the copy NPC in the off-line mode may be added to the experience value of the player character when the off-line mode ends to resume the game. The proportion of the total experience value which is to be added to the experience value of the player character may be progressively reduced as the total experience value increases.

The experience values obtained by a plurality of copy NPCs generated in on-line mode may not be added up, but only the experience values of the copy NPC which has obtained the experience values most among the copy NPCs may be added to the experience value of the player character when the on-line mode ends to resume the game.

When only the experience value of a single copy NPC is reflected to the experience value of the player character when the game is resumed this way, various parameters of this copy NPC at the time of the log-in process may be reflected on the various parameters of the player character when the game is resumed, together with the experience value or in place thereof. Only a specific parameter among various parameters may be selectively reflected.

According to the embodiment, an off-line registered player character has its copy NPC generated by the player character copying operation or the like by another player, and the copy NPC moves while the registered player character is off-line. However, the network game system according to the invention is not limited to this particular case, and the player character itself may be moved when the video game apparatus 100 manipulated by the player is off-line.

According to the embodiment, when the video game apparatus 100 is off-line, a copy NPC gets an experience value in a battle, and its level does not move up even when the experience value becomes a predetermined experience value at which the level moves up. However, the level of a copy NPC may be set to move up when the experience value thereof becomes a predetermined experience value at which the level moves up as done when the video game apparatus 100 is on-line.

According to the embodiment, battle-relating movements of a copy NPC and an autopilot PC are analyzed and decided based on the latest 100 movements of the player character which have been selected by the player. The procedures for the analysis and decision may be set as follows.

The movements of plural types of battles are classified into individual types of features of the movements, such as attacks on opponents, attaching spells to opponents, and recovering spells to friends. The ratios of the movement features are acquired by counting the movements in each of the types of movements (hereinafter referred to as "movement feature types") in the latest 100 movements selected by the player, and the movements of a copy NPC and an autopilot PC may be decided based on the ratios.

The latest 100 movements may be stored only in the video game apparatus 100 as an action log, only counted data on the movement feature types which are acquired through the procedure at the time of registering the copy NPC may be handed into the server apparatus 200, and the movement of the copy NPC may be decided by the server apparatus 200 based on the data.

At the time of counting the latest 100 movements, the movements may be weighted based on the timings at which the movements are selected (whether a movement is new or old in the action log), and the movement feature types may be evaluated based on the weights.

The weighting may be set by, for example, "10" for the latest ten movements, "9" for the next ten movements, "8" for the next ten movements, and so forth, and the weight values may be added up for each movement feature type. Then, the movements of a copy NPC and an autopilot PC may be decided based on the ratios of the weight values in each movement feature type to the total weight of the entire movement feature types. This approach can allow the movements of a copy NPC and an autopilot PC to reflect newer tendencies of movements as the movements selected by the player, so that the movements of the copy NPC and the autopilot PC character can be set closer to the movements selected by the player.

With regard to the latest 100 movements to be stored in the action log, modes of the tendencies of movements preset in the game may be assigned to the individual player characters based on the ratios acquired in the above manner according to the movement feature types, and the evaluation thereof. This can reduce the amount of information to be stored in the server apparatus 200.

Although a method of clearly expressing, to other players, whether a player character which is movable as an autopilot PC is an autopilot PC or not, and whether a copy NPC is a copy NPC or not according to the embodiment, the method may be clarified. As one way clarifying the method, when a player character is moving as an autopilot PC, for example, a message "moving as an autopilot PC" may be displayed above the player character, or moving as an autopilot PC and canceling of the autopilot movement may be declared using a chat capability.

At this time, the control unit 203 of the server apparatus 200 may refer to the autopilot flag 405 stored in the player character management table 400, the player character may be displayed on the display device 121 when the player character is an autopilot PC (ON (1)), and information indicating that the player character is moving as an autopilot PC may be included in the server game progress information which is transmitted to a video game apparatus 100 which is manipulated by another player. The control unit 103 of the video game apparatus 100 which has received this server game progress information may display information clarifying that the player character is moving as an autopilot PC on the display device 121.

This approach can make it difficult for other players to misunderstand that the player is moving the player's own player character while the player character is caused to be moving as an autopilot PC so that, for example, the player may leave the game. Even when players chat each other in the network game according to the embodiment, chat-based statements to a player character whose player is not attending can be reduced.

In case of a copy NPC, to give such a clear expression to other players, indication such as "copy NPC" may be shown above the copy NPC displayed on the display device 121. At this time, the control unit 203 of the server apparatus 200 likewise includes information indicating that the player character is moving as a copy NPC in the server game progress information, so that the control unit 103 of the video game apparatus 100 which has received the information displays the information clarifying the movement of the copy NPC on the display device 121. The player character and copy NPC may be provided with distinguishable display effects, such as enhanced contours of the characters, which are different from the display effect of a player character which is moved by a player.

According to the embodiment, the video game apparatus 100 or a dedicated game apparatus is used as a device which becomes the platform to play a video game. According to the invention, however, a general-purpose personal computer or the like which includes components similar to those of the video game apparatus 100 and has a network connecting capability may be constructed a platform. A portable game apparatus (including a cellular phone having a capability of running applications) which is configured to have the display device 121 and the sound output device 125 accommodated in the same casing as the casing of the main body 101.

A semiconductor memory card may be adopted as the recording medium 131 in place of a DVD-ROM or CD-ROM. A card slot where the memory card is inserted may be provided in placed of the DVD/CD-ROM drive 113. In case of a general-purpose personal computer, the program and data according to the invention may be provided in the form of being prestored on the HDD 107, not stored in the recording medium 131. Any recording medium may be optionally used to store and provide the program and data according to the invention according to the physical form of the hardware and the distribution form.

According to the embodiment, the program and data for the video game apparatus 100 are stored in the recording medium 131 for distribution. Instead, the program and data may be stored on a fixed disk apparatus included in the server apparatus located on a network, and distributed to the main body 101 via the network 151. The video game apparatus 100 can save the program and data, received at the communication interface 115 from the server apparatus 200, in the HDD 107, and load them into the RAM 105 at the time the program is run. The program and data which are used in the server apparatus 200 may be stored on a fixed disk apparatus included in another server apparatus located on a network, and distributed to the main body 201 via the network 151.

The invention claimed is:

1. A network game system including a server, and a plurality of terminal apparatuses connected to the server over a network, wherein each of players who respectively use the plurality of terminal apparatuses manipulates a player character to participate in a game provided by the server, the server comprising:
   a connecting state manger that manages information indicating whether each of the plurality of terminal apparatuses is connected to the server;
   a character movement information receiver that receives character movement information transmitted from a connected terminal apparatus among the plurality of terminal apparatuses which is connected to the server;
   a character information storage that stores information according to a progress of the game including a movement state of a player character of a player which uses the connected terminal apparatus among the plurality of terminal apparatuses which is connected to the server;
   a character movement state updater that updates the movement state of the player character stored in the character information storage according to the character movement information received by the character movement information receiver;
   a history storage that stores a history of the movement state of the player character corresponding to each of the plurality of terminal apparatuses when each of the plurality of terminal apparatuses is connected to the server;
   an automatic movement specifier that specifies a movement of a player character of a player who uses a disconnected terminal apparatus which is not connected to the server based on a determination made by the server, not based on reception of the character movement information by the character movement information receiver, the movement of the player character of the player using the disconnected terminal apparatus being based on the movement state of the player character corresponding to the disconnected terminal apparatus which is not connected to the server and stored in the character information storage and the history of the movement state stored in the history storage; and
   a game progress information transmitter that transmits, to the connected terminal apparatus among the plurality of terminal apparatuses which is connected to the server, game progress information indicating the progress state of the game according to the movement state of the player character stored in the character information storage for the connected terminal apparatus connected to the server, and the movement state of the player character specified by the automatic movement specifier for the disconnected terminal apparatus which is not connected to the server,
   each terminal apparatus of the plurality of terminal apparatuses comprising:
      a game progress information receiver that receives the game progress information transmitted from the game progress information transmitter;
      a game screen display that generates a screen according to the game progress information received by the game progress information receiver, and displays the screen on a display device equipped in the terminal apparatus;
      a manual movement instruction input that, as the player who uses the terminal apparatus performs a predetermined operation on an input device equipped in the terminal apparatus, inputs a manual movement instruction for moving the player character of the player;
      a manual movement specifier that specifies a movement of the player character of the player using the terminal apparatus according to the manual movement instruction input from manual movement instruction input; and
      a character movement information transmitter that generates the character movement information according to the movement of the player character of the player specified by the manual movement specifier, and transmits the character movement information to the server to be received by the character movement information receiver.

2. The network game system according to claim 1, wherein the automatic movement specifier increases a weight of a newer history among the history of the movement state stored in the history storage to specify the movement of the player character of the player using the disconnected terminal apparatus.

3. The network game system according to claim 1, wherein the server further includes:
- an unconnected character information storage that stores information including the movement state of the player character of the player using the disconnected terminal apparatus which is not connected to the server in addition to the information stored in the character information storage;
- a character information copier that copies the information on the player character of the player using the disconnected terminal apparatus which is not connected to the server and stored in the character information storage, and stores the copied information in the unconnected character information storage; and
- an unconnected character information updater that updates the information on the player character in the information stored in the unconnected character information storage according to the movement of the player character specified by the automatic movement specifier.

4. The network game system according to claim 3, wherein the character information storage stores a predetermined parameter which is set for each player character and whose value is updated according to the progress of the game, as the information according to the progress of the game for the player character of the player using the connected terminal apparatus which is connected to the server,
- the unconnected character information storage stores a predetermined parameter which is set for each player character and whose value is updated according to the progress of the game, as the information according to the progress of the game for the player character of the player using the disconnected terminal apparatus which is not connected to the server, and
- the server further includes a parameter-in-connection-mode updater that updates the value of the predetermined parameter stored in the character information storage according to the value of the predetermined parameter stored in the unconnected character information storage when the disconnected terminal apparatus which has not been connected to the server is connected thereto.

5. The network game system according to claim 3, wherein the character information copier is capable of making a plurality of copies of the information on the player character of the player using the disconnected terminal apparatus which is not connected to the server and stored in the character information storage, according to requests from different players, and storing the plurality of copies in the unconnected character information storage, and
- the automatic movement specifier specifies the movement of the player character of the player using the disconnected terminal apparatus which is not connected to the server as a separate player character for each of the copies of the information stored in the unconnected character information storage.

6. The network game system according to claim 3, wherein the character information storage stores position information of the player character of the player using the connected terminal apparatus which is connected to the server, as information according to the progress of the game for the player character of the player using the connected terminal apparatus connected to the server,
- the unconnected character information storage stores position information of the player character of the player using the disconnected terminal apparatus which is not connected to the server, as information according to the progress of the game for the player character of the player using the disconnected terminal apparatus not connected to the server, and
- when the disconnected terminal apparatus which has not been connected to the server is connected thereto, the server updates the position information on the player character of the player using the disconnected terminal apparatus and stored in the character information storage, according to the position information stored in the unconnected character information storage.

7. The network game system according to claim 1, wherein each of the plurality of terminal apparatuses further includes an indicator that indicates whether the automatic movement specifier is allowed to specify the movement of the player character of the player using the connected terminal apparatus which is connected to the server according to selection by the player, when the connected terminal apparatus is disconnected from the server.

8. The network game system according to claim 1, wherein the game progress information transmitter transmits the game progress information including automatic movement information indicating that the player character is one whose movement is specified by the automatic movement specifier, and
- the game screen display displays the player character being one whose movement is specified by the automatic movement specifier on the display device based on the automatic movement information included in the game progress information.

9. A server connected to a plurality of terminal apparatuses over a network, and providing a game in which players respectively using the plurality of terminal apparatuses participate by manipulation of player characters of the players, the server comprising:
- a connecting state manger that manages information indicating whether each of the plurality of terminal apparatuses is connected to the server;
- a character movement information receiver that receives character movement information transmitted from a connected terminal apparatus among the plurality of terminal apparatuses which is connected to the server and according to a movement of a player character which is specified according to a manual movement instruction input by the player using the connected terminal apparatus;
- a character information storage that stores information according to a progress of the game including a movement state of the player character which uses the connected terminal apparatus among the plurality of terminal apparatuses which is connected to the server;
- a character movement state updater that updates the movement state of the player character stored in the character information storage according to the character movement information received by the character movement information receiver;
- an unconnected character information storage that stores information including a movement state of a player character of a player using a disconnected terminal apparatus which is not connected to the server apparatus in addition to the information stored in the character information storage;
- a character information copier that copies the information on the player character of the player using the disconnected terminal apparatus which is not connected to the server apparatus and stored in the character information storage, and stores the copied information in the unconnected character information storage;

an automatic movement specifier that specifies a movement of a player character of a player who uses a terminal apparatus which is not connected to the server based on determination made by the server, not reception of the character movement information by the character movement information receiver;

an unconnected character information updater that updates the information on the player character in the information stored in the unconnected character information storage according to the movement of the player character specified by the automatic movement specifier; and a game progress information transmitter that transmits, to the connected terminal apparatus among the plurality of terminal apparatuses which is connected to the server, game progress information for causing a display device equipped by the connected terminal apparatus connected to the server to display a progress state of the game according to the movement state of the player character stored in the character information storage unit for the connected terminal apparatus connected to the server, and the movement state of the player character specified by the automatic movement specifier for the disconnected terminal apparatus which is not connected to the server.

10. The server according to claim 9, wherein the server apparatus further includes a history storage that stores a history of the movement state of the player character corresponding to each of the plurality of terminal apparatuses when each of the plurality of terminal apparatuses is connected to the server apparatus, and the automatic movement specifier specifies the movement of the player character of the player using the disconnected terminal apparatus based on the movement state of the player character corresponding to the disconnected terminal apparatus which is not connected to the server and stored in the character information storage and the history of the movement state stored in the history storage.

11. The server according to claim 9, wherein the automatic movement specifier increases a weight of a newer history among the history of the movement state stored in the history storage to specify the movement of the player character of the player using the disconnected terminal apparatus.

12. The server according to claim 9, wherein the character information storage stores a predetermined parameter which is set for each player character and whose value is updated according to the progress of the game, as the information according to the progress of the game for the player character of the player using the connected terminal apparatus which is connected to the server, the unconnected character information storage stores a predetermined parameter which is set for each player character and whose value is updated according to the progress of the game, as the information according to the progress of the game for the player character of the player using the disconnected terminal apparatus which is not connected to the server, and the server further includes a parameter-in-connection-mode updater that updates the value of the predetermined parameter stored in the character information storage according to the value of the predetermined parameter stored in the unconnected character information storage when the disconnected terminal apparatus which has not been connected to the server is connected thereto.

13. The server according to claim 9, wherein the character information copier is capable of making a plurality of copies of the information on the player character of the player using the disconnected terminal apparatus which is not connected to the server and stored in the character information storage, according to requests from different players, and storing the plurality of copies in the unconnected character information storage, and the automatic movement specifier specifies the movement of the player character of the player using the disconnected terminal apparatus which is not connected to the server as a separate player character for each of the copies of the information stored in the unconnected character information storage.

14. The server according to claim 9, wherein the character information storage stores position information of the player character of the player using the connected terminal apparatus which is connected to the server, as information according to the progress of the game for the player character of the player using the connected terminal apparatus connected to the server, the unconnected character information storage stores position information of the player character of the player using the disconnected terminal apparatus which is not connected to the server, as information according to the progress of the game for the player character of the player using the disconnected terminal apparatus not connected to the server, and when the disconnected terminal apparatus which has not been connected to the server is connected thereto, the server updates the position information on the player character of the player using the disconnected terminal apparatus and stored in the character information storage, according to the position information stored in the unconnected character information storage.

15. The server according to claim 9, wherein each of the plurality of terminal apparatuses further includes an indicator that indicates whether the automatic movement specifier is allowed to specify the movement of the player character of the player using the connected terminal apparatus which is connected to the server according to selection by the player, when the connected terminal apparatus is disconnected from the server.

16. The server according to claim 9, wherein the game progress information transmitter transmits the game progress information including automatic movement information indicating that the player character is one whose movement is specified by the automatic movement specifier, and the game screen display displays the player character being one whose movement is specified by the automatic movement specifier on the display device based on the automatic movement information included in the game progress information.

17. A network game system including a server, and a plurality of terminal apparatuses connected to the server over a network, wherein each of players who respectively use the plurality of terminal apparatuses manipulates a player character to participate in a game provided by the server, the server comprising:

a connecting state manger that manages information indicating whether each of the plurality of terminal apparatuses is connected to the server;

a character movement information receiver that receives character movement information transmitted from a connected terminal apparatus among the plurality of terminal apparatuses which is connected to the server;

a character information storage that stores information according to a progress of the game including a movement state of a player character of a player which uses the connected terminal apparatus among the plurality of terminal apparatuses which is connected to the server;

a character movement state updater that updates the movement state of the player character stored in the character information storage according to the character movement information received by the character movement information receiver;

an unconnected character information storage that stores information including a movement state of a player character of a player using a disconnected terminal apparatus which is not connected to the server apparatus in addition to the information stored in the character information storage;

a character information copier that copies the information on the player character of the player using the disconnected terminal apparatus which is not connected to the server apparatus and stored in the character information storage, and stores the copied information in the unconnected character information storage; and an automatic movement specifier that specifies the movement of the player character of the player who uses the disconnected terminal apparatus which is not connected to the server based on a determination made by the server, not based on reception of the character movement information by the character movement information receiver;

an unconnected character information updater that updates the information on the player character in the information stored in the unconnected character information storage according to the movement of the player character of the player who uses the disconnected terminal apparatus specified by the automatic movement specifier; and a game progress information transmitter that transmits, to the connected terminal apparatus among the plurality of terminal apparatuses which is connected to the server, game progress information indicating the progress state of the game according to the movement state of the player character stored in the character information storage for the connected terminal apparatus connected to the server, and the movement state of the player character specified by the automatic movement specifier for the disconnected terminal apparatus which is not connected to the server, each terminal apparatus of the plurality of terminal apparatuses comprising:

a game progress information receiver that receives the game progress information transmitted from the game progress information transmitter;

a game screen display that generates a screen according to the game progress information received by the game progress information receiver, and displays the screen on a display device equipped in the terminal apparatus;

a manual movement instruction input that, as the player who uses the terminal apparatus performs a predetermined operation on an input device equipped in the terminal apparatus, inputs a manual movement instruction for moving the player character of the player;

a manual movement specifier that specifies a movement of the player character of the player using the terminal apparatus according to the manual movement instruction input from manual movement instruction input; and a character movement information transmitter that generates the character movement information according to the movement of the player character of the player specified by the manual movement specifier, and transmits the character movement information to the server to be received by the character movement information receiver.

18. The network game system according to claim 17, wherein the character information storage stores a predetermined parameter which is set for each player character and whose value is updated according to the progress of the game, as the information according to the progress of the game for the player character of the player using the connected terminal apparatus which is connected to the server, the unconnected character information storage stores a predetermined parameter which is set for each player character and whose value is updated according to the progress of the game, as the information according to the progress of the game for the player character of the player using the disconnected terminal apparatus which is not connected to the server, and the server further includes a parameter-in-connection-mode updater that updates the value of the predetermined parameter stored in the character information storage according to the value of the predetermined parameter stored in the unconnected character information storage when the disconnected terminal apparatus which has not been connected to the server is connected thereto.

19. The network game system according to claim 17, wherein the character information copier is capable of making a plurality of copies of the information on the player character of the player using the disconnected terminal apparatus which is not connected to the server and stored in the character information storage, according to requests from different players, and storing the plurality of copies in the unconnected character information storage, and the automatic movement specifier specifies the movement of the player character of the player using the disconnected terminal apparatus which is not connected to the server as a separate player character for each of the copies of the information stored in the unconnected character information storage.

20. The network game system according to claim 17, wherein the character information storage stores position information of the player character of the player using the connected terminal apparatus which is connected to the server, as information according to the progress of the game for the player character of the player using the connected terminal apparatus connected to the server, the unconnected character information storage stores position information of the player character of the player using the disconnected terminal apparatus which is not connected to the server, as information according to the progress of the game for the player character of the player using the disconnected terminal apparatus not connected to the server, and when the disconnected terminal apparatus which has not been connected to the server is connected thereto, the server updates the position information on the player character of the player using the disconnected terminal apparatus and stored in the character information storage, according to the position information stored in the unconnected character information storage.

* * * * *